(12) United States Patent
Buentello et al.

(10) Patent No.: US 12,388,268 B1
(45) Date of Patent: Aug. 12, 2025

(54) SYSTEMS AND METHODS FOR ADJUSTING ELECTRIC POWER TO DEVICES

(71) Applicant: United Services Automobile Association (USAA), San Antonio, TX (US)

(72) Inventors: Andre Rene Buentello, San Antonio, TX (US); Dustin Bowen Bitter, Lehi, UT (US); Brennen Michael Ricks, San Antonio, TX (US); Jose L. Romero, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 10 days.

(21) Appl. No.: 18/507,538

(22) Filed: Nov. 13, 2023

Related U.S. Application Data

(63) Continuation of application No. 17/708,523, filed on Mar. 30, 2022, now Pat. No. 11,817,711.

(51) Int. Cl.
*H02J 3/38* (2006.01)

(52) U.S. Cl.
CPC ........... *H02J 3/381* (2013.01); *H02J 2300/24* (2020.01)

(58) Field of Classification Search
CPC .......... H02J 3/38; H02J 3/381; H02J 2300/22; H02J 2300/24
USPC ........................................................ 307/18
See application file for complete search history.

(56) References Cited

U.S. PATENT DOCUMENTS

| | | |
|---|---|---|
| 8,843,772 B2 | 9/2014 | Hormuth |
| 9,207,744 B2 | 12/2015 | Li et al. |
| 10,097,003 B2 | 10/2018 | Nanda |
| 10,942,527 B2 | 3/2021 | Berkley et al. |
| 11,431,169 B1 | 8/2022 | Buttgenbach et al. |
| 2010/0030392 A1 | 2/2010 | Ferentz et al. |
| 2012/0245752 A1 | 9/2012 | Borrett et al. |
| 2012/0323393 A1 | 12/2012 | Imhof et al. |
| 2014/0195831 A1 | 7/2014 | Hamdi et al. |
| 2015/0005978 A1 | 1/2015 | Nakakita et al. |
| 2016/0156195 A1* | 6/2016 | Kouno ................... G05B 19/10 307/31 |
| 2017/0373536 A1 | 12/2017 | Al Hajjaj |
| 2018/0240201 A1 | 8/2018 | Eda et al. |
| 2022/0116235 A1 | 4/2022 | Ernohazy et al. |
| 2023/0273580 A1 | 8/2023 | Nakagawa et al. |

OTHER PUBLICATIONS

"Span Smart Panel—SPAN®: A Smarter Electric Panel." Span®, Sep. 19, 2019, 8 pages, https://www.span.io/panel.

* cited by examiner

*Primary Examiner* — Hal Kaplan
(74) *Attorney, Agent, or Firm* — Fletcher Yoder P.C.

(57) ABSTRACT

A system includes an electrical connection system configured to transmit electric power to a plurality of devices associated with a structure and a control system associated with the structure. The control system is configured to receive data indicative of a respective priority associated with the plurality of devices and operate the electrical connection system to control flow of electric power to the plurality of devices based on the data.

19 Claims, 10 Drawing Sheets

SYSTEMS AND METHODS FOR ADJUSTING ELECTRIC POWER TO DEVICES

CROSS-REFERENCE TO RELATED APPLICATION

The present application is a continuation of U.S. patent application Ser. No. 17/708,523, titled "SYSTEMS AND METHODS FOR ADJUSTING ELECTRIC POWER TO DEVICES," filed on Mar. 30, 2022, which is herein incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be noted that these statements are to be read in this light, and not as admissions of prior art.

Electricity is commonly used to provide power to devices. For example, electric power may be used for operating a light, charging a battery, providing a heat source, and so forth. Electric power may be generated at and/or distributed via a central electric power source (e.g., a power station, a macrogrid) and/or a distributed electric power source (e.g., a microgrid, a minigrid). Unfortunately, existing systems and methods for controlling electric power distribution to different devices of one or more consumers or customers is somewhat limited. For instance, there may be limited control associated with adjusting distribution of electric power to different consumers and/or adjusting flow of electric power to different devices for a single consumer, such as to control power provided to different devices. As such, usage of electric power to the devices may not be desirable.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
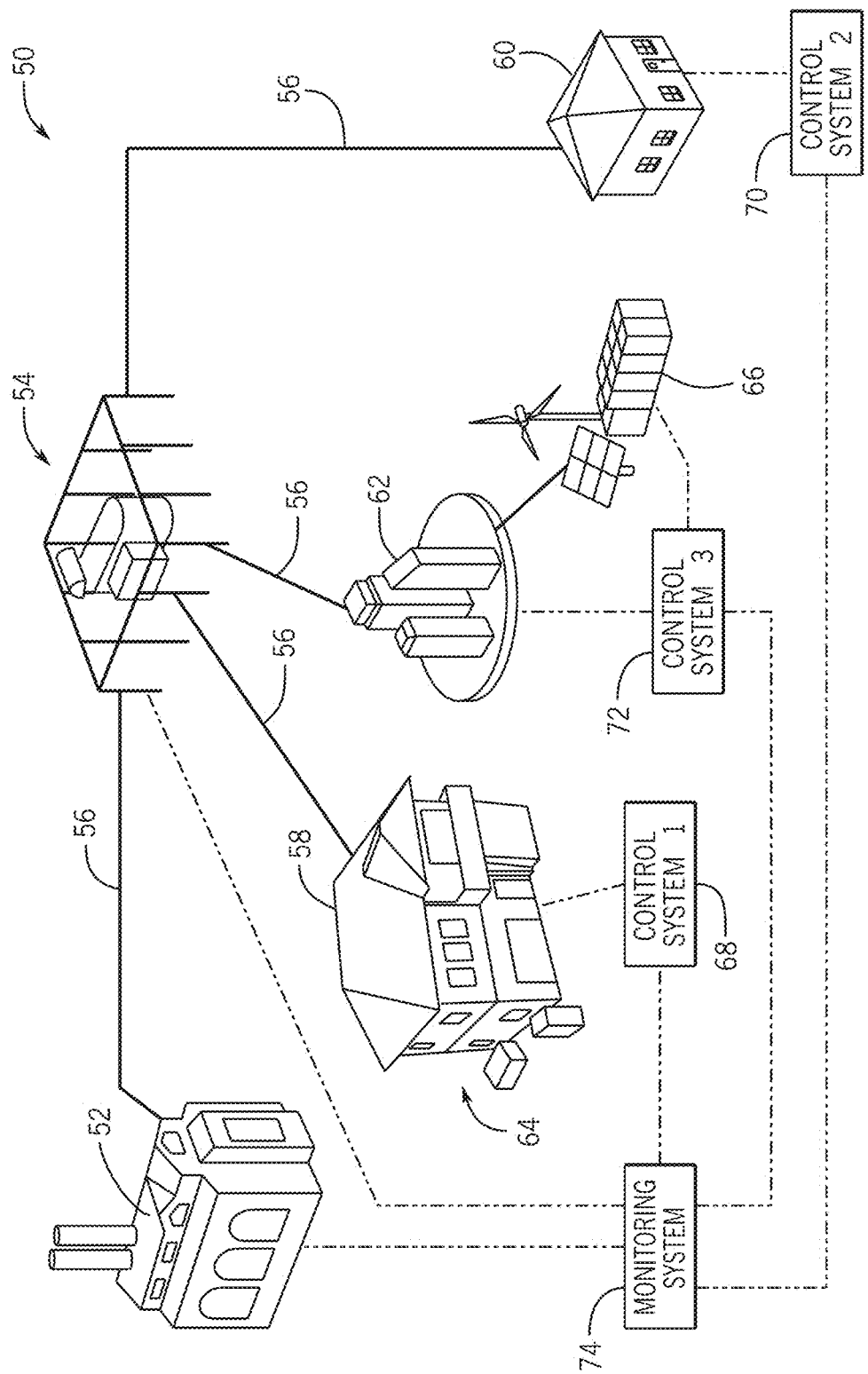
FIG. 1 is a schematic diagram of an embodiment of an electric power system configured to distribute electricity to various consumers, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure are generally directed to systems and methods for controlling electrical energy usage and/or distribution. Various consumers or customers may receive electrical energy from different electric power sources. As an example, a central electric power source may be configured to provide electric power to consumers having associated structures or buildings located at different geographical locations. As another example, a distributed electric power source may be configured to provide electric power to consumers having associated structures that are located within a common geographical location. Indeed, a single consumer may receive electric power from a central electric power source and/or a distributed electric power source. Devices associated with a consumer may receive and operate utilizing the electric power, such as to provide operations for occupants of a structure associated with the consumer and/or to enable functionalities of an organization associated with the consumer. As used herein, a consumer (e.g., an electricity consumer or customer) may refer to a single entity, such as an individual person, a family, a company, a factory, and the like, and its associated structure(s) and/or device(s) for which electricity may be provided at a cost for usage (e.g., generation, transmission, distribution, delivery) to the entity. Additionally, as used herein, electrical energy may refer to a total amount of electricity generated, consumed, distributed, delivered, or otherwise used for a period of time, and electric power may refer to a rate in which electrical energy is used.

It may be desirable to improve usage and/or distribution of electric power. As an example, improving control of electric power flow to different devices of a consumer may enable greater flexibility or customization to operate the devices. As another example, improving control of electric power distribution from the central electric power source to different consumers may enable more efficient or suitable usage of electric power associated with the consumers. For instance, amounts of electric power may be more suitably allotted to different consumers, such as to increase an amount of electric power available for a consumer that may consume a greater amount of electric power received from the central electric power source (e.g., as opposed to from a distributed electric power source). In such examples, electric power may be more suitably utilized, such as by providing sufficient electric power to and enabling desirable operation of devices associated with different consumers.

In some embodiments, flow of electric power to certain devices associated with a single consumer may be controlled. For instance, the devices may be associated with different priorities, and flow of electric power may be distributed based on the priority of the devices. As an example, in situations in which there may be limited available electric power (e.g., insufficient electric power to power all devices), electric power may be distributed to devices of a higher or greater priority. The consumer (e.g., a user) may designate the priority of the devices. Thus, the flow of electric power to the devices to enable operation of the devices may be more suitable, desirable, or appropriate to the consumer. In additional or alternative embodiments, flow of electric power to different consumers may be controlled. By way of example, distribution of electric power from the central electric power source (e.g., when there is limited available electric power) may be adjusted based on respective electric power consumptions by the consumers. For instance, first electric power consumption by a first consumer may be less than second electric power consumption by a second consumer. As such, a first amount of electric power allotted to the first consumer may be less than a second amount of electric power allotted to the second consumer. In this manner, adequate electric power may provided to each of the first consumer and the second consumer as compared to allotting the same amount of electric power to each of the first consumer and the second consumer regardless of their differing electric power consumptions. That is, electric power may be more suitably adjusted for distribution between consumers.

In further embodiments, a cost associated with providing electric power to consumers may be adjusted. For example, in order to encourage consumers to utilize electric power provided by a distributed electric power source instead of electric power provided by a central electric power source for certain devices and/or at certain times, the consumption of electric power provided by the central electric power source and/or provided by the distributed electric power source may be monitored. The cost associated with consumption of electric power provided by the central electric power source for a consumer may be reduced based on desirable consumption of the electric power provided by the central electric power source and/or provided by the distributed electric power source.

With the preceding in mind, FIG. 1 is a schematic diagram of an embodiment of an electric power system 50 through which electricity may flow. For example, the electric power system 50 may include a central electric power source 52, which may include a power station, a power plant, a generating station, and/or a generating plant. The central electric power source 52 may be configured to generate electricity, such as by burning fossil fuels, harvesting energy (e.g., solar energy, wind energy, hydroelectric energy, geothermal energy) from an ambient environment and/or environmental elements, utilizing nuclear reactions, and the like. The central electric power source 52 may deliver the generated electricity to a transmission and/or distribution system 54 (e.g., a substation) via transmission or power lines 56. The transmission and/or distribution system 54 may distribute the electricity received from the central electric power source 52 to various electricity consumers or customers via the transmission lines 56. For example, the transmission and/or distribution system 54 may distribute electricity to residential consumers (e.g., households), such as to a first residential consumer 58 and/or a second residential consumer 60. The transmission and/or distribution system 54 may additionally or alternatively distribute electricity to an organization, commercial, or industrial consumer 62 (e.g., a campus or group of buildings), such as a hospital, a factory, an office, a school, a military base, and the like. In some embodiments, the transmission and/or distribution system 54 may adjust the electricity (e.g., a voltage of the electricity) received from the central electric power source 52 to more appropriate levels that are usable by the consumers 58, 60, 62. Furthermore, in certain embodiments, the transmission and/or distribution system 54 may also be configured to generate some electricity for distribution to the consumers 58, 60, 62 (e.g., in addition to the electricity delivered by the central electric power source 52).

It should be noted that the illustrated central electric power source 52 may represent multiple different central electric power sources 52 configured to generate electricity, and the illustrated transmission and/or distribution system 54 may represent multiple different transmission and/or distribution systems 54 configured to receive electricity from the central electric power source(s) 52 and distribute the electricity to various consumers. Indeed, each transmission and/or distribution system 54 may be configured to distribute electricity to different residential consumers and/or different organization consumers, such as consumers that are located at different geographical areas (e.g., different neighborhoods, different towns, different cities, different counties). The flow of electric power from the central electric power source 52, to the transmission and/or distribution system 54, and to the consumers 58, 60, 62 (e.g., via the transmission lines 56) may be a part of an electrical macrogrid, and consumption of electrical energy received from the central electric power source 52 via the macrogird may be referred to as central electrical energy consumption.

In some embodiments, the transmission and/or distribution system 54 may adjust the amount of electricity distributed to the consumers 58, 60, 62. For example, each residential consumer 58, 60 may consume less electricity than that consumed by the organization consumer 62. For instance, the devices associated with the residential consumers 58, 60 may consume less electricity as compared to that consumed by the devices associated with the organization consumer 62. As such, the transmission and/or distribution system 54 may distribute a greater amount of electric power to the organization consumer 62. Indeed, in some circumstances (e.g., when adequate electric power is being generated at the central electric power source 52), electric power provided by the transmission and/or distribution system 54 may be readily available for consumption by the consumers 58, 60, 62. That is, electricity may readily flow from the transmission and/or distribution system 54 to the consumers 58, 60, 62 to fulfill, satisfy, achieve, or complete an electrical consumer demand (e.g., a request by a consumer to provide electricity to power devices) of the consumers 58, 60, 62. In certain embodiments, the central electric power source 52 and the transmission and/or distribution system 54 may be a part of a common company or organization (e.g., an electrical utility company). In additional or alternative embodiments, the central electric power source 52 and the transmission and/or distribution system 54 may be associated with different companies.

The first residential consumer 58 may also be configured to receive electric power from a local electric power source, a distributed power source, or a distributed energy resource. For example, a microgrid 64, such as a generator (e.g., a portable generator, a whole house generator, a standby generator), a power storage (e.g., a battery), and/or a solar panel (e.g., a solar cell, a photovoltaic cell), may be configured to generate and/or store electricity and provide local electric power that may supplement the central electric power received from the central electric power source 52. In certain embodiments, the available electric power provided by the microgrid 64 may reduce or limit the amount of central electric power consumed by the first residential consumer 58. In this way, at least a portion of the electrical consumer demand of the first residential consumer 58 may be fulfilled by the microgrid 64. However, in contrast, the second residential consumer 60 may not be configured to receive electric power from a local electric power source. Therefore, substantially all of the electrical consumer demand of the second residential consumer 60 may be fulfilled by the central electric power. Thus, a lower amount of central electric power may be consumed to fulfill the electrical consumer demand of the first residential consumer 58. For this reason, the transmission and/or distribution system 54 may distribute less electric power to the first residential consumer 58 than to the second residential consumer 60, and a cost associated with consumption of central electrical energy for the first residential consumer 58 may be less than that associated with consumption of central electrical energy for the second residential consumer 60. Indeed, in some embodiments, substantially all of the electrical consumer demand of the first residential consumer 58 may be fulfilled by the microgrid 64, and the first residential consumer 58 therefore may not consume a substantial amount of the central electrical energy. For example, the microgrid 64 may generate a surplus of electric power and/or may store sufficient electrical energy to provide electric power to the first residential consumer 58 such that the transmission and/or distribution system 54 may not deliver electric power to the first residential consumer 58 for a period of time.

The organization consumer 62 may also be configured to receive electric power from another local electric power source, such as a minigrid 66. The minigrid 66 may include a generator, a power storage, a solar panel, a wind turbine, and so forth, that produces sufficient electrical energy for consumption by the organization consumer 62. For example, the minigrid 66 may be configured to generate more electric power than that generated by the microgrid 64 in order to fulfill the electrical consumer demand of the organization consumer 62 that may be greater than the electrical consumer demand of the first residential consumer 58. The electricity generated and/or stored by the minigrid 66 may reduce consumption of central electric power by the organization consumer 62. By way of example, the local electric power provided by the minigrid 66 may fulfill substantially all of the electrical consumer demand of the organization consumer 62. Thus, the central electric power provided by the transmission and/or distribution system 54 to the organization consumer 62 may be limited. The minigrid 66 of the organization consumer 62 may be separate from the microgrid 64 of the first residential consumer 58. For example, the microgrid 64 may not be configured to distribute electric power directly to the organization consumer 62 (e.g., without usage of the transmission lines 56 of the macrogrid), and/or the minigrid 66 may not be configured to distribute electric power directly to the first residential consumer 58 (e.g., without usage of the transmission lines 56). Similarly, neither the microgrid 64 nor the minigrid 66 may be configured to distribute electric power directly to the second residential consumer 60.

Each consumer 58, 60, 62 may include a respective control system (e.g., a programmable controller, a control panel, a control board, a computing device, a mobile device) configured to adjust usage of electricity. By way of example, the first residential consumer 58 may include a first control system 68 configured to control flow of electricity through the structure associated with the first residential consumer 58. For instance, the first control system 68 may be configured to control generation of local electric power via the microgrid 64, distribution of local electric power from the microgrid 64 (e.g., to select devices associated with the first residential consumer 58), and/or distribution of central electric power from the transmission and/or distribution system 54 (e.g., to select devices). A second control system 70 of the second residential consumer 60 may control distribution of central electrical energy. A third control system 72 of the organization consumer 62 may be configured to control generation of local electric power via the minigrid 66, distribution of local electric power from the minigrid 66 (e.g., to select devices associated with the organization consumer 62), and/or distribution of central electric power from the transmission and/or distribution system 54 (e.g., to select devices). In this manner, each of the control systems, 68, 70, 72 may independently control usage of electric power by the respective consumers 58, 60, 62, such as to control respective power provided to devices associated with the consumers 58, 60, 62.

In some circumstances, there may be a limited availability in central electric power as compared to a regular or normal central electric power availability condition. As an example, during a brownout condition, the transmission and/or distribution system 54 may be configured to distribute a limited or reduced amount of electric power to the consumers 58, 60, 62. For instance, the central electric power provided to the consumers 58, 60, 62 may not sufficiently fulfill an entirety of the respective electrical consumer demands of the consumers 58, 60, 62 (e.g., to enable full operation of all devices associated with the consumers 58, 60, 62). As a result, for example, operation of certain devices (e.g., of the second residential consumer 60) may be reduced (e.g., to a partial operating mode that consumes less electrical energy than that consumed during a full operating mode) and/or suspended. Thus, a total amount of electric power provided to the consumers 58, 60, 62 may be reduced to accommodate the reduced availability of central electric power. Additionally or alternatively, an increased amount of local electric power may be consumed to fulfill the respective electrical consumer demands while there is limited availability in central electric power. By way of example, the first residential consumer 58 may consume an increased amount of electricity generated and/or stored by the microgrid 64, and/or the organization consumer 62 may consume an increased amount of electricity generated and/or stored by the minigrid 66. The increased consumption of local electric power may help offset the reduced availability of central electric power in order to fulfill the respective electrical consumer demands (e.g., without reducing operation of devices consuming electricity). In other words, despite there being limited availability in central electric power, operation of the devices of the first residential consumer 58 and/or of the organization consumer 60, as enabled via local electric power, may be similar to that during the regular central electric power availability condition.

As another example, during a blackout condition (e.g., a power outage), the transmission and/or distribution system 54 may not be configured to distribute a substantial amount of electric power to the consumers 58, 60, 62. The blackout condition may be a result of unavailability of central electric power (e.g., the central electric power source 52 is not generating sufficient electricity, the transmission and/or distribution system 54 is not receiving sufficient electricity from the central electric power source 52, and so forth), a fault associated with the transmission lines 56 to interrupt transmission of central electric power, and/or a rolling blackout condition (e.g., rotating outage, rotational load shedding) in which electric power is controllably blocked from distribution to certain consumers for a duration of time. Thus, electrical consumer demands may not be fulfilled via the central electric power during the blackout condition. For this reason, substantially all of the electrical consumer demand of the first residential consumer 58 may be fulfilled via local electric power (e.g., via the microgrid 64), and/or substantially all of the electrical consumer demand of the organization consumer 62 may be fulfilled via local electric power (e.g., via the minigrid 66). Indeed, in certain embodiments, the microgrid 64 and/or the minigrid 66 may provide sufficient local electric power to enable full operation of various devices of the first residential consumer 58 and/or the organization consumer 62, respectively, during the blackout condition. In this manner, operation of certain devices of the first residential consumer 58 and/or of the organization consumer 62 during the blackout condition may be similar to that during the brownout condition and/or the regular central electric power availability condition. However, since the second residential consumer 60 may not be configured to use local electrical energy, operation of the devices associated with the second residential consumer 60 may be reduced or suspended.

Improved control of distributing electric power may help fulfill electrical consumer demands, reduce costs associated with consumption of central electric power, and/or improve efficient usage of electric power, including during the regular central electric power availability condition, the brownout condition, and/or the blackout condition. As an example, controlling consumption of local electric power relative to consumption of central electric power may reduce consumption of central electrical energy. For instance, during a brownout condition, a first consumer (e.g., the first residential consumer 58, the organization consumer 62) may further increase consumption of local electric power, such as to fulfill substantially all of the electrical consumer demand of the first consumer, and reduce consumption of central electric power (e.g., such that the transmission and/or distribution system 54 does not distribute a substantial amount of central electric power to the first consumer). Thus, an increased amount of central electric power, which may otherwise have been distributed to the first consumer, may be available for consumption by a second consumer (e.g., the second residential consumer 60) that may not have sufficient or any local electric power available to fulfill the electrical consumer demand of the second consumer. As a result, central electric power may be diverted to a certain consumer and improve fulfillment of various electrical consumer demands. As another example, controlling distribution of local electric power to certain devices may improve reliable operation of the devices. For instance, a device may be powered by local electric power even when central electric power is available for consumption. Indeed, blackout and/or brownout conditions may not interrupt or block the flow of local electric power provided by local electric power sources. Thus, the blackout and/or brownout conditions may not affect or interrupt operation (e.g., full operation) of the device powered by the local electric power. In this manner, desirable operation of the device may be maintained regardless of the availability of the central electric power.

In some embodiments, the electric power system 50 may include a monitoring system 74 communicatively coupled to the control systems 68, 70, 72. The monitoring system 74 may be configured to receive data from the control systems 68, 70, 72, such as data indicative of electrical energy consumption (e.g., consumption of central electrical energy, consumption of local electrical energy, electrical energy distribution to devices associated with the consumers 58, 60, 62). The monitoring system 74 may also be communicatively coupled to the transmission and/or distribution system 54 (e.g., a corresponding control system of the transmission and/or distribution system 54), and the monitoring system 74 may be configured to communicate with the transmission and/or distribution system 54 based on the data received from the control systems 68, 70, 72.

As an example, the monitoring system 74 may be configured to instruct the transmission and/or distribution system 54 to adjust how central electric power is distributed. For instance, in response to determining that the first residential consumer 58 does not consume a substantial amount of central electric power (e.g., during a brownout condition when there is limited availability of central electric power), the monitoring system 74 may instruct the transmission and/or distribution system 54 to reduce central electric power distributed to the first residential consumer 58. As such, there may be an increased availability of central electric power for distribution to another consumer. In certain embodiments, the monitoring system 74 may be configured to receive an indication of a requested or target recipient of the increased availability of central electric power. By way of example, a user (e.g., an occupant, a customer) of the first residential consumer 58 may provide a request via the first control system 68 to increase central electric power (e.g., central electric power that would otherwise be distributed to the first residential consumer 58) being distributed to the second residential consumer 60. The monitoring system 74 may receive the request and, in response, provide an indication to the transmission and/or distribution system 54 to increase central electric power being distributed to the second residential consumer 60.

As another example, the monitoring system 74 may provide an indication that a cost associated with consumption of central electrical energy is to be adjusted (e.g., reduced). For instance, in response to determining that the first residential consumer 58 reduced consumption of central electrical energy during a limited central electric power availability condition (e.g., a brownout condition, a blackout condition), the monitoring system 74 may determine that the first residential consumer 58 increased availability of central electric power and, therefore, helped fulfill an electrical consumer demand of another consumer. For this reason, the monitoring system 74 may reduce a cost associated with the consumption of central electrical energy for the first residential consumer 58 during a regular central electric power availability condition as compensation for helping increase the availability of central electric power during the limited central electric power availability condition. For example, the monitoring system 74 may communicate with the transmission and/or distribution system 54 (e.g., a company associated with the transmission and/or distribution system 54) to reduce a cost associated with providing the central electric power to the first residential consumer 58. Similarly, the monitoring system 74 may adjust the cost associated with consumption of central electrical energy based on consumption of local electrical energy. By way of example, in order to encourage usage of local electric power (e.g., to reduce an electrical load to be provided by the central electric power source 52, to improve reliable operation of a device), the monitoring system 74 may provide an indication to reduce a cost associated with consumption of central electrical energy in response to determining that the consumption of local electrical energy is above a threshold level.

As a further example, the monitoring system 74 may also provide information to the control systems 68, 70, 72. Such information may include information associated with the central electric power source 52 and/or the transmission and/or distribution system 54 (e.g., a detected blackout condition, a detected brownout condition, an amount of available central electric power), information associated with another one of the control systems 68, 70, 72, monitored electricity information (e.g., electricity usage), and so forth. Thus, the monitoring system 74 may facilitate data communication between the control systems 68, 70, 72 amongst one another and/or between the control systems 68, 70, 72, the central electric power source 52, and/or the transmission and/or distribution system 54. The control systems 68, 70, 72 may be configured to operate (e.g., to adjust flow of electricity) based on the information received from the monitoring system 74.

In additional or alternative embodiments, the control systems 68, 70, 72 may be directly communicatively coupled to the transmission and/or distribution station 54 (e.g., a corresponding control system of the transmission and/or distribution system 54) and/or the central electric power source 52 (e.g., a corresponding control system of the central electric power source 52). In this manner, the transmission and/or distribution station 54 and/or the central electric power source 52 may directly receive data indicative of electrical energy usage by the consumers 58, 60, 62. That is, the control systems 68, 70, 72 may directly transmit the data to the transmission and/or distribution system 54 and/or the central electric power source 52 without usage of the monitoring system 74. In such embodiments, the transmission and/or distribution system 54 may automatically adjust distribution of central electric power to the consumers 58, 60, 62, adjust a cost associated with consumption of central electrical energy, and so forth, based on the data received from the control systems 68, 70, 72. Additionally or alternatively, the control systems 68, 70, 72 may directly receive data from the transmission and/or distribution system 54 and/or the central electric power source 52. The control systems 68, 70, 72 may automatically operate based on the data received from the transmission and/or distribution system 54 and/or the central electric power source 52 (e.g., without communication from the monitoring system 74).

Figure 2:
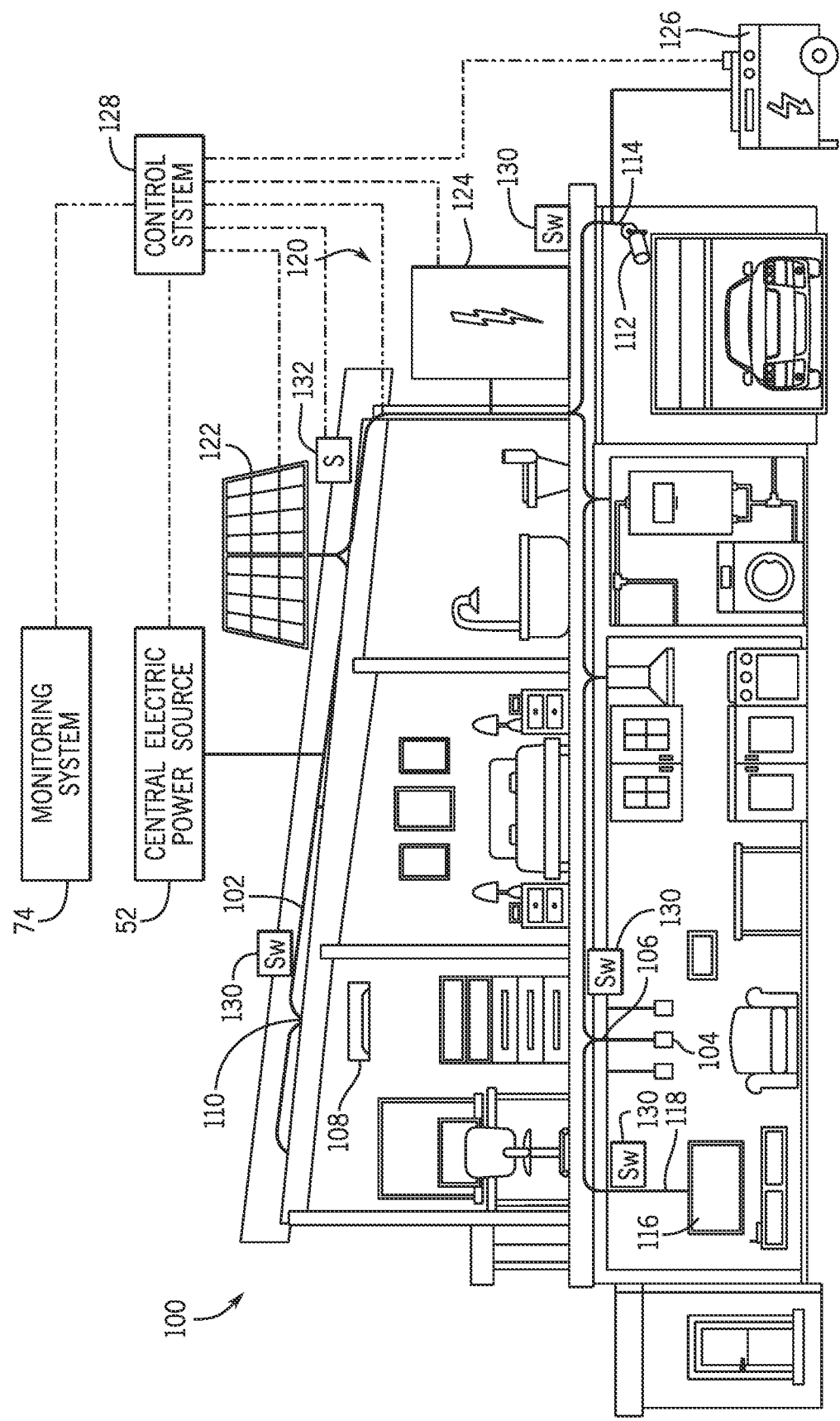
FIG. 2 is a side view of an embodiment of a structure configured to utilize energy from various energy sources, in accordance with an embodiment of the present disclosure.

FIG. 2 is a side view of an embodiment of a structure 100, such as a residential household, of a consumer (e.g., the first residential consumer 58). The structure 100 may include various devices that may be powered via electricity. To this end, the structure 100 may include an electrical connection system 102, which may include wiring configured to transmit, distribute, or direct electricity throughout the structure 100, electrical outlets (e.g., electrical sockets, electrical receptacles) configured to provide electricity to a device electrically coupled to the electrical outlet, insulation configured to block undesirable flow of electricity (e.g., away from the wiring), and/or other components to facilitate directing electricity to provide power to devices associated with the structure 100. By way of example, the structure 100 may include a first device 104 (e.g., lights) configured to receive electric power via a first electrical outlet 106 of the electrical connection system 102. A second device 108 (e.g., heating, ventilation, and air conditioning (HVAC) equipment) may be configured to receive electric power via a second electrical outlet 110 of the electrical connection system 102. A third device 112 (e.g., a security camera) may be configured to receive electric power via a third electrical outlet 114 of the electrical connection system 102. A fourth device 116 (e.g., a television) may be configured to receive electric power via a fourth electrical outlet 118 of the electrical connection system 102. Indeed, the structure 100 may include any suitable quantity and types of devices configured to receive electric power and operate using the electric power.

The electrical connection system 102 may be configured to receive electric power from any suitable power source, such as the central electric power source 52 (e.g., via the transmission and/or distribution system 54, the transmission lines 56, and so forth) and/or a local electric power source 120 (e.g., the microgrid 64). In the illustrated embodiment, the local electric power source 120 includes a solar panel 122, a power storage 124, and a portable generator 126. The solar panel 122 may harvest and generate electric power using solar energy, then distribute the harvested electric power to the electrical connection system 102 for consumption by devices of the structure 100. The portable generator 126 may convert certain energy, such as mechanical energy and/or chemical energy, to electrical energy and provide the converted electrical energy as electric power to the electrical connection system 102 for usage. The power storage 124 may be configured to store any suitable electrical energy, including electrical energy harvested by the solar panel 122, electrical energy converted by the portable generator 126, electrical energy previously stored (e.g., by a manufacturer) therein, central electrical energy received from the central electric power source 52, and so forth. The power storage 124 may be configured to provide the stored electrical energy as electric power to the electrical connection system 102 for usage. In certain embodiments, the power storage 124 may be configured to directly couple to (e.g., physically attach to) certain devices, such as a battery, a computing device, an electric vehicle, and so forth, and provide electric power (e.g., facilitate distributing local electric power from other components of the local electric power source 120) to such devices. The local electric power source 120 may also include any other suitable components, devices, or systems configured to provide electric power to the electrical connection system 102.

In some embodiments, the structure 100 may include a control system 128 (e.g., the first control system 68) configured to control flow of electricity throughout the structure 100. As an example, the control system 128 may be communicatively coupled to the local power source 120 (e.g., each of the solar panel 122, the power storage 124, and the portable generator 126) and may control operation of the local power source 120 to generate electricity and/or to provide electricity to the electrical connection system 102. For instance, the control system 128 may be configured to control relative amounts of electric power provided by the solar panel 122, the power storage 124, and/or the portable generator 126 to power the devices 104, 108, 112, 116. As another example, the control system 128 may control flow of electricity from the central electric power source 52 through the electrical connection system 102. For instance, the control system 128 may be configured to enable electricity to flow from the central electric power source 52 to the devices 104, 108, 112, 116 and/or to the power storage 124. The control system 128 may additionally or alternatively interrupt or block flow of electricity from the central electric power source 52 to the electrical connection system 102, such as in response to a determination that sufficient electric power is provided via the local power source 120. As a further example, the control system 128 may control flow of electricity through the electrical outlets of the electrical connection system 102. Thus, the control system 128 may control the electric power received by different devices of the structure 100 to operate.

In some instances, the control system 128 may block flow of electric power to certain devices. By way of example, in response to a determination that there is limited available central electric power and/or limited available local electric power, the control system 128 may selectively enable flow of electric power to some devices and block flow of electric power to other devices. To this end, the control system 128 may enable or block flow of electric power through certain sections or portions of the electrical connection system 102, such as by enabling or blocking flow of electric power through the electrical outlets (e.g., the electrical outlets 106, 110, 114, 118) in order to control flow of electric power to the devices (e.g., the devices 104, 108, 112, 116). For example, each electrical outlet may be associated with a respective switch 130 (e.g., a relay, an actuator, a breaker, a disconnect), and the control system 128 may be configured to operate the switch 130 to enable or interrupt flow of electricity through the electrical outlet and to a corresponding device. That is, the control system 128 may be configured to open one of the switches 130 to block flow of electric power through the associated electrical outlet and close the switch 130 to enable flow of electrical power through the electrical outlet.

The control system 128 may identify the electrical outlet corresponding to (e.g., electrically coupled to) each device, determine whether each device is to receive electric power, and operate the switch 130 associated with the electrical outlet based on a determination of whether the corresponding device is to receive electric power. In some embodiments, the control system 128 may associate the electrical outlets to respective, corresponding devices based on a user input, which may map the electrical outlets to the devices. In additional or alternative embodiments, the control system 128 may automatically associate the electrical outlets to respective, corresponding devices (e.g., without a user input), such as based on data indicative of a particular device configured to receive electric power from a certain outlet. Such data may include, for example, location data (e.g., of the devices relative to the electrical outlets), data indicative of electrical coupling between the devices and the electrical outlets, data indicative of electrical energy characteristics (e.g., electric power usage, frequency of operation) of a device coupled to an electrical outlet and a possible device or type of device having such electrical energy characteristics, and so forth. To this end, the control system 128 may be communicatively coupled to a sensor 132 configured to monitor a parameter associated with the structure 100 (e.g., associated with the devices) and to provide the data to the control system 128 based on the monitored parameter. The control system 128 may operate the electrical connection system 102, such as the switches 130, based on the data received from the sensor 132 By controlling electric power provided to the devices of the structure 100, the control system 128 may adjust consumption of electrical energy associated with the structure 100.

In certain embodiments, the control system 128 may control electric power provided to the devices based on a user input. As an example, the user input may indicate a priority of each device, and the control system 128 may control flow of electric power based on the relative priorities of the devices. For instance, the user input may indicate that the second device 108 and the third device 112 are of a high priority, the first device 104 is of an intermediate priority, and the fourth device 116 is of a low priority. In an example situation, the control system 128 may determine that the amount of available electric power (e.g., the central electric power, the local electric power) is sufficient to provide electric power to devices of the high priority, but not of the intermediate priority and of the low priority. In response, the control system 128 may operate the electrical connection system 102 (e.g., the switches 130) to enable flow of electrical power to the second device 108 and the third device 112 and to block flow of electrical power to the first device 104 and the fourth device 116 based on the indicated priorities of the devices 104, 108, 112, 116. In response to determining that the amount of available electric power has increased to enable providing electric power to devices of the intermediate priority, the control system 128 may operate the electrical connection system 102 to enable flow of electrical to the first device 104, but continue to block flow of electrical power to the fourth device 116. In this manner, the control system 128 may selectively enable and block flow of electrical power to particular devices of the structure 100 based on the available electric power, and the priority of devices, which may be set by the user.

The control system 128 may additionally or alternatively control distribution of electric power provided by the particular electric power source to certain devices. That is, the control system 128 may selectively enable or block flow of central electric power, local electric power, or both to certain devices. By way of example, each electrical outlet may be electrically coupled to the central electric power source 52 and the local electric power source 120 in parallel with one another, and separate switches 130 may control flow of central electric power from the central electric power source 52 and flow of local electric power from the local electric power source 120 to the electrical outlet. The switch 130 controlling flow of central electric power to an electrical outlet may be independently operated from the switch 130 controlling flow of local electric power to the same electrical outlet. Thus, for instance, the control system 128 may be configured to operate the switches 130 to enable one of local electric power or central electric power, both local electric power and central electric power, or neither local electric power nor central electric power to flow to a particular electrical outlet.

For example, the local electric power provided by the local electric power source 120 (e.g., the solar panel 122) may be more reliable than the central electric power provided by the central electric power source 52. For instance, the local electric power source 120 may be subject to fewer or less frequent power interruptions, such as brownout and/or blackout conditions. As such, the control system 128 may enable flow of local electric power from the local electric power source 120 to particular devices, such as those (e.g., the second device 108 and the third device 112) of the high priority, to enable more reliable operation of such devices. However, the control system 128 may determine that there is insufficient local electric power to provide electric power to other devices, such as those (e.g., the first device 104 and the fourth device 116) of lower or lesser priority. In response, the control system 128 may enable flow of central electric power from the central electric power source 52, instead of flow of local electric power from the local electric power source 120, to such devices. As such, the control system 128 may select the particular electric power source used to enable operation of different devices of the structure 100.

The monitoring system 74 may be communicatively coupled to the control system 128 and may monitor operation of the control system 128. As an example, the monitoring system 74 may communicate with the control system 128 to determine usage of electricity associated with the structure 100, such as based on operation of the control system 128 to enable and/or block flow of electric power to the devices, to distribute the electric power provided by the different electric power sources, to operate the local electric power source 120, and the like. As another example, the monitoring system 74 may communicate with the control system 128 to determine prioritization of the devices of the structure 100 (e.g., based on the user input received by the control system 128). The monitoring system 74 may be configured to operate based on communication with the control system 128. For instance, the monitoring system 74 may be configured to adjust a cost associated with consumption of electrical energy received from the central electric power source 52 (e.g., by communicating with the transmission and/or distribution system 54), adjust the central electric power distributed by the transmission and/or distribution system 54 (e.g., adjust an amount of available central electric power available to the structure 100), provide a notification to the control system 128 (e.g., regarding the prioritization of devices), and so forth. Such operation of the monitoring system 74 may improve overall usage of electricity (e.g., of central electrical energy), such as by fulfilling a greater number of electrical consumer demands for different consumers.

Although the structure 100 discussed herein may be associated with the first residential consumer 58 having the microgrid 64, the features and techniques described with respect to FIG. 2 may be similarly applied to the structure(s) associated with the second residential consumer 60 and/or the organization consumer 62. In an example, the second control system 70 may be configured to control flow of central electric power from the central electric power source 52 to different devices associated with the second residential consumer 60 (e.g., based on prioritization of the devices and/or an amount of available central electric power). In another example, the third control system 72 may be configured to control flow of local electric power from the minigrid 66 and/or from the central electric power source 52 to different devices associated with the organization consumer 62. Furthermore, although a single structure 100 is illustrated in FIG. 2, it should be noted that multiple structures, each having different devices powered by electric power, may be associated with a single consumer, and the control system 128 may be configured to control flow of electricity to the devices of the different structures. For example, the electrical connection system 102 or a separate electrical connection system may be configured to enable flow of electric power to the devices of different structures, and the control system 128 may be configured to operate the electrical connection system(s) 102 to control electric power provided to the devices.

Figure 3:
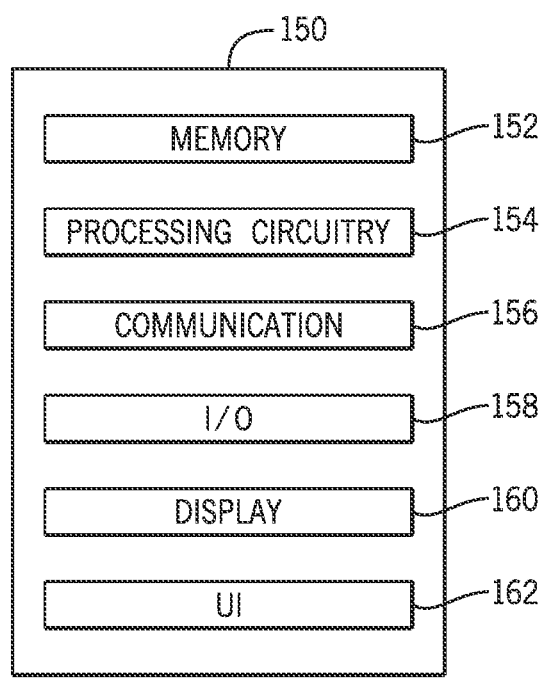
FIG. 3 is a schematic diagram of a computing system that may be used to control usage and/or distribution of electricity, in accordance with an embodiment of the present disclosure.

FIG. 3 is a schematic diagram of an embodiment of a computing system 150 (e.g., control circuitry) that may be used to perform certain techniques described herein. For example, the computing system 150 may be utilized by the control system 128 (e.g., any of the control systems 68, 70, 72) and/or the monitoring system 74. The computing system 150 may include a memory 152 and a processor or processing circuitry 154. The memory 152 may include a non-transitory computer-readable medium that may store instructions that, when executed by the processor 154, may cause the processor 154 to perform various methods described herein. To this end, the processor 154 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 154 may, in some embodiments, include multiple processors.

The computing system 150 may also include a communication link or system 156, which may include a wireless and/or wired communication component to communicatively couple to another device or system (e.g., to communicatively couple the control system 128 and the monitoring system 74 to one another). For instance, the communication link 156 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN) (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, 5G New Radio (5G NR) cellular). The communication link 156 may also include a network interface to enable communication via various protocols such as EtherNet/IP®, ControlNet®, DeviceNet®, or any other industrial communication network protocol.

Additionally, the computing system 150 may include input/output (I/O) ports 158 that may be used for communicatively coupling the computing system 150 to an external device. For example, the I/O ports 158 of the computing system 150 of the control system 128 may communicatively couple to corresponding I/O ports 158 of the computing system 150 of the monitoring system 74, corresponding I/O ports of the electrical connection system 102, corresponding I/O ports of the local power source 120, to name some examples. The computing system 150 may further include a display 160 that may be any suitable image-transmitting component configured to present any suitable imagery, image data, or visualization. For example, the display 160 may include a display screen configured to output visual information to a user (e.g., an occupant, a customer) to enable the user to observe an operation, a status, a parameter, and/or other suitable information associated with a consumer. Further still, the computing system 150 may include a user interface (UI) 162 with which the user may interact to control operation of the computing system 150. For instance, the user may utilize the UI 162 to provide a user input (e.g., to assign or set the priority of devices) and cause operation (e.g., selectively enable or block flow of electricity to devices) based on the user input. The UI 162 may include a touch screen (e.g., as a part of the display 160), an eye-tracking sensor, a gesture (e.g., hand) tracking sensor, a joystick or physical controller, a button, a knob, a switch, a dial, a trackpad, a mouse, another component, or any combination thereof.

Each of FIGS. 4-6 described below illustrates a respective UI, which may be an embodiment or a part of the UI 162. For example, each UI of FIGS. 4-6 may be presented via the display 160, such as of the control system 128. In some embodiments, the display 160 may separately present each UI. In additional or alternative embodiments, the display 160 may simultaneously or concurrently present each UI (e.g., adjacent to one another). In further embodiments, the display 160 may present features of the different UIs in a different manner, such as to present certain features of separately depicted UIs in a common or shared UI. A user may interact with each UI to provide a user input to the control system 128, and the control system 128 may operate based on the user input received via the UIs. For instance, the control system 128 may control flow of electricity for a consumer based on the user input.

Figure 4:
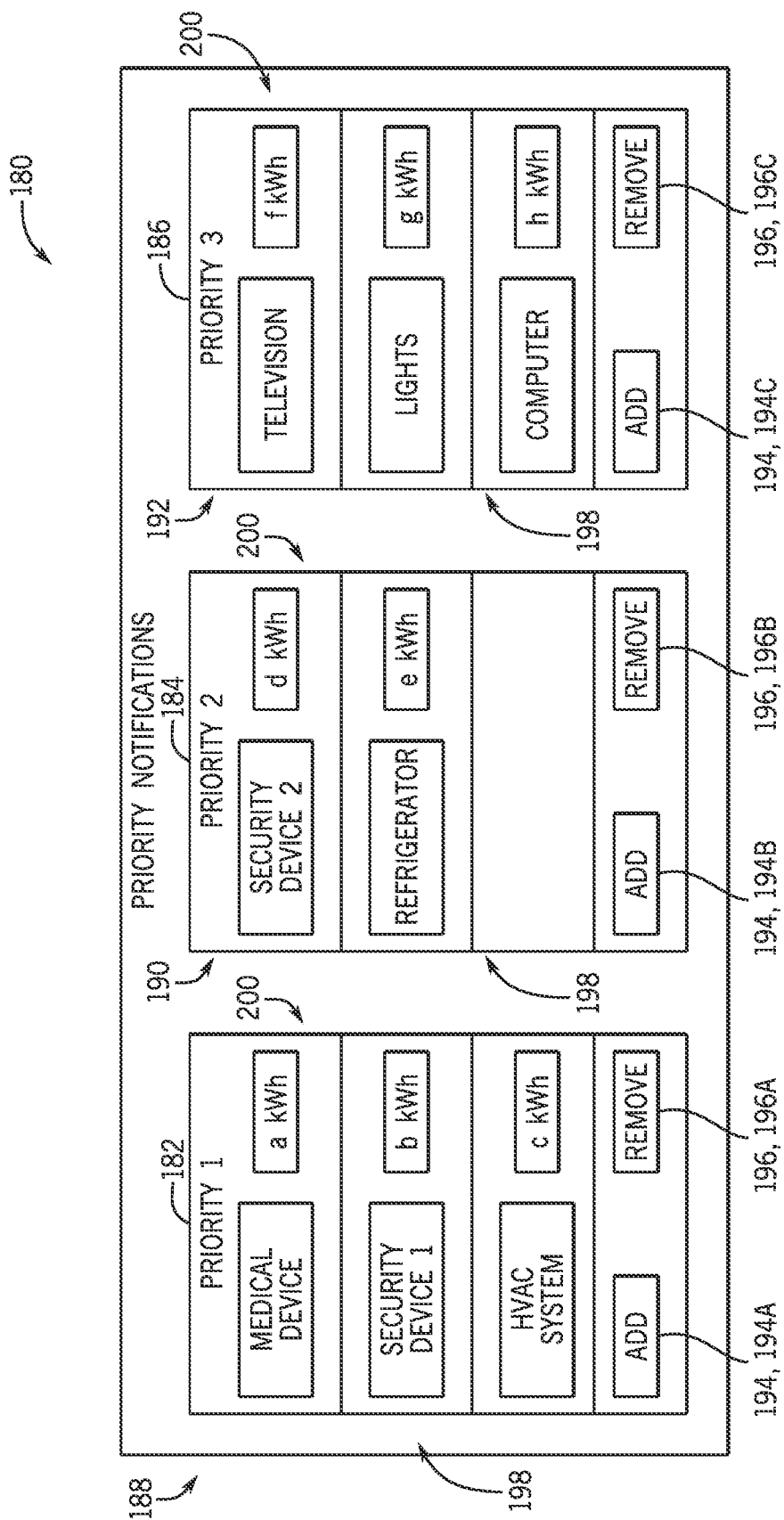
FIG. 4 is an embodiment of a user interface that may be utilized to adjust prioritization of devices configured to receive electric power, in accordance with an embodiment of the present disclosure.

FIG. 4 is an embodiment of a first UI 180, which may be utilized to assign different devices of a consumer to respective priorities. In the illustrated embodiment, the first UI 180 may include a first menu 182 corresponding to a first priority (e.g., a high priority), a second menu 184 corresponding to a second priority (e.g., an intermediate priority), and a third menu 186 corresponding to a third priority (e.g., a low priority). The first UI 180 may include additional menus associated with other priorities (e.g., a priority higher than the first priority, a priority lower than the third priority). Each menu 182, 184, 186 may include a respective set of devices (e.g., zero devices, one device, two devices or more), and each device is assigned to the priority corresponding to menu in which the device is included. For example, the first menu 182 may include first device icons 188 representing devices that are assigned to the first priority, the second menu 184 may include second device icons 190 that are assigned to the second priority, and the third menu 186 may include third device icons 192 that are assigned to the third priority. The control system 128 may be configured to control flow of electricity based on the priority of devices as indicated via the first UI 180.

The user may utilize the first UI 180 in order to assign or change the priority of devices. By way of example, each menu 182, 184, 186 may include a respective "add" icon and "remove" icon used to add a device to or remove a device from, respectively an associated menu 182, 184, 186. For instance, the first menu 182 may include a first "add" icon 194A and a first "remove" icon 196A, the second menu 184 may include a second "add" icon 194B and a second "remove" icon 196B, and the third menu 186 may include a third "add" icon 194C and a third "remove" icon 196C. Selection of the "add" icon 194 (e.g., via a touchscreen and/or a cursor) may enable the user to select a device from a list of devices to be added to the menu (e.g., the first menu 182) and, accordingly, assigned to the priority (e.g., the first priority) corresponding to the menu. Selection of the "remove" icon 196 may enable the user to select a device from a list of devices (e.g., devices currently presented in the menu) to be removed from the menu and, accordingly, the device may be unassigned from the priority corresponding to the menu. Indeed, via the "add" icons 194 and the "remove" icons 196, the user may be able to move devices between menus to adjust the priority of the devices. For example, the user may utilize the first UI 180 to provide a user input that increases a priority of a device (e.g., by moving the device from the second menu 184 to the first menu 182). In response to the user input, the control system 128 may be configured to prioritize flow of electricity to the device, such as to enable flow of electricity to the device prior to devices associated with a lower priority.

In some circumstances, a certain device may not be included in any of the menus 182, 184, 186 of the first UI 180. For example, the user may not have added the device to any of the menus 182, 184, 186 via the "add" icon 194 (e.g., upon removing the device from one of the menus 182, 184, 186 via the "remove" icon 196, upon newly connecting the device to the electrical connection system 102). In certain embodiments, the device may be assigned to a baseline priority, such as a priority that is lower than the third priority. In this manner, devices that are not specifically assigned to a particular priority (e.g., by the user) may be automatically assigned to a priority to enable the control system 128 to control relative flow of electricity to the devices.

In some embodiments, the first UI 180 may present information that may help or guide the user to assign the devices to respective priorities. For example, the device icons 188, 190, 192 may include identifier icons 198 providing identifying information for the devices. The identifying information may include, for instance, a type or category of the device, a name (e.g., a manufacturer name, a user-customized name), a serial code, and/or any other suitable identifying information. The user may therefore utilize the identifier icons 198 to recognize which devices are being referred to by the device icons 188, 190, 192. The device icons 188, 190, 192 may also include electricity consumption icons 200 providing information related to consumption of electric power and/or electrical energy by the devices. For example, the electricity consumption icons 200 may provide rated electricity consumption (e.g., based on manufacturer specification), estimated electricity consumption (e.g., based on electricity consumption of the same or similar types of other devices), historical electricity consumption, user-defined electricity consumption, and the like. The user may utilize such information to determine suitable priorities for the devices. By way of example, the user may determine to assign a device to a lower priority due to a high consumption of electricity, which may reduce available electric power that may be provided to other devices. The first UI 180 may also be configured to present other types of information to help the user assign a device to a priority, such as a location of the device (e.g., the room in which the device is positioned), a frequency of usage (e.g., a duration of time in which the device is in operation to receive electric power), or any other suitable information. Thus, the user may more suitably utilize the first UI 180 to control operation of the control system 128 to direct electricity to devices.

Figure 5:
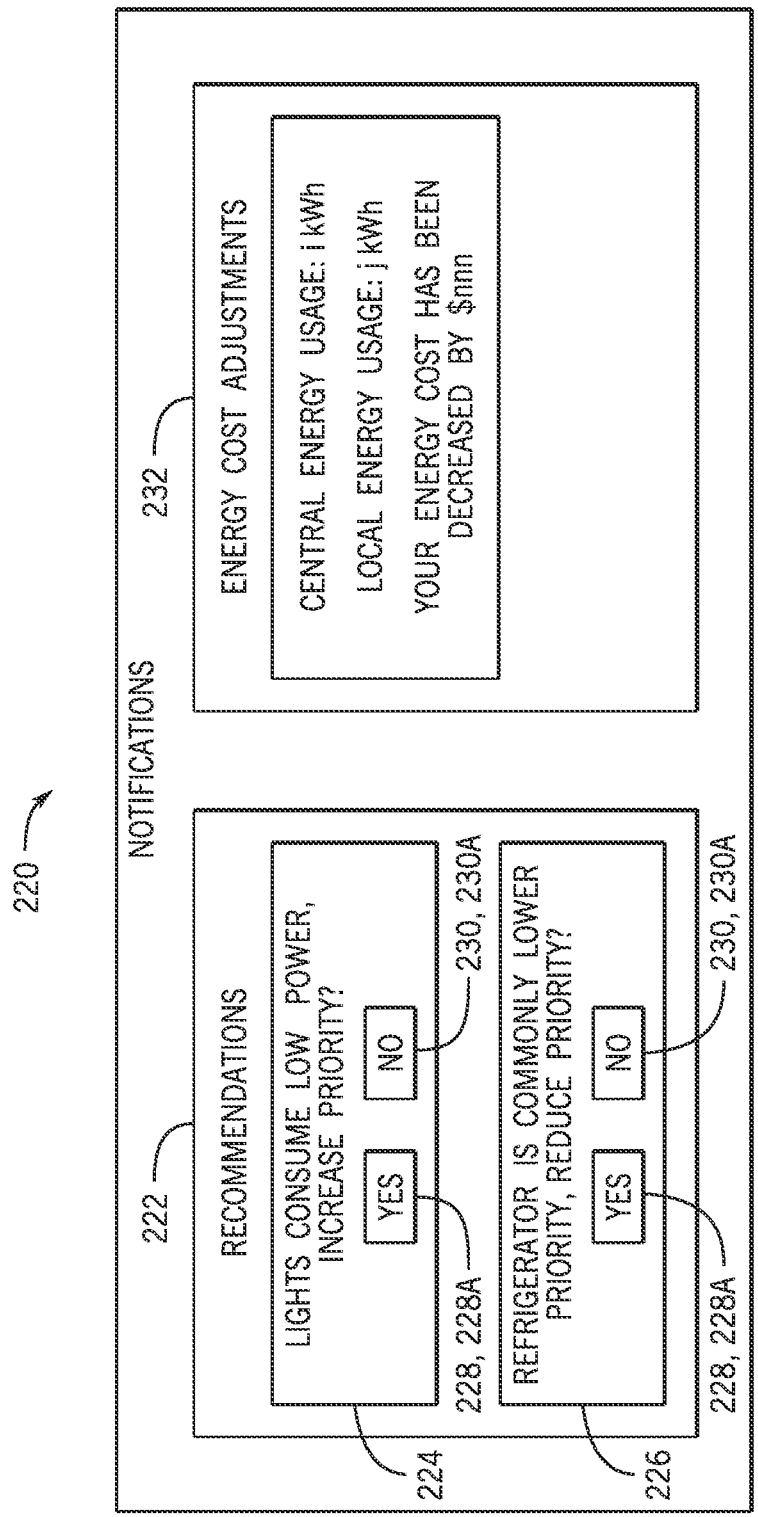
FIG. 5 is an embodiment of a user interface that may be utilized to provide notifications associated with electric energy usage, in accordance with an embodiment of the present disclosure.

FIG. 5 is an embodiment of a second UI 220, which may provide notifications to the user. Although the second UI 220 discussed herein primarily refers to the control system 128 as providing the notifications (e.g., recommendation) based on various determinations, the control system 128 may additionally or alternatively be configured to provide the notifications via the second UI 220 based on communication with the monitoring system 74. For example, the monitoring system 74 may be configured to monitor information related to the priority of devices and prompt the control system 128 to provide a notification (e.g., without the control system 128 directly monitoring such information).

In the illustrated embodiment, the second UI 220 includes a first menu 222, which may include various recommendations or notifications to adjust priority of devices. In some embodiments, the control system 128 may be configured to determine electricity consumed by the devices and output a recommendation based on the determined electricity consumption. As an example, in response to determining that electricity consumption of a device (e.g., a light) is below a threshold level (e.g., a threshold level associated with a current priority of the device, a threshold level associated with a potentially more appropriate priority of the device), the control system 128 may output a first recommendation menu 224 that may enable the user to increase the priority of the device. As another example, in response to determining electricity consumption of a device is above a threshold level, the control system 128 may output a recommendation menu that may enable the user to reduce the priority of the device. In additional or alternative embodiments, the control system 128 may be configured to determine a priority assigned to other devices or types of devices similar to a particular device (e.g., a refrigerator, a cooler), such as devices for other consumers and assigned to respective priorities via the other consumers, and the control system 128 may compare a current priority of the particular device to the respective priorities assigned to the other devices. In response to a determination that the current priority of the particular device is different from a typical (e.g., most common) priority assigned to the other devices, the control system 128 may be configured to output a second recommendation menu 226 that may enable the user to adjust the current priority of the particular device toward the typical priority. In further embodiments, the control system 128 may be configured to output a recommendation based on other information, such as a frequency of usage of a device being above or below a threshold level, a current priority of a device being different than some other expected priority of the device, and so forth.

Each of the recommendation menus 224, 226 may include a "yes" icon 228 and a "no" icon 230. That is, the first recommendation menu 224 may include a first "yes" icon 228A and a first "no" icon 230A, and the second recommendation menu 226 may include a second "yes" icon 228B and a second "no" icon 230B. Selection of the "yes" icon 228 for one of the recommendation menus 224, 226 may cause the control system 128 to adjust the priority of a corresponding device (e.g., without having to utilize the first UI 180 to adjust or assign the priority of the corresponding device). For example, selection of the first "yes" icon 228A may cause the control system 128 to increase the priority of the device (e.g., a light) associated with the first recommendation menu 224 (e.g., from the third priority to the second priority). Selection of the second "yes" icon 228B may cause the control system 128 to reduce the priority of the device (e.g., a refrigerator) associated with the second recommendation menu 226 (e.g., from the second priority to the third priority). Moreover, selection of the "no" icon 230 for one of the recommendation menus 224, 226 may block adjustment of the priority of the corresponding device. That is, a current priority of the corresponding device may be maintained. In the illustrated example, selection of the first "no" icon 230A may block increasing the priority of the device associated with the first recommendation menu 224, and selection of the second "no" icon 230B may block reducing the priority of the device associated with the second recommendation menu 226. Thus, the second UI 220 may guide the user to provide more suitable priority of devices and/or facilitate ease of adjusting priority of devices.

The second UI 220 may also include a second menu 232, which may indicate adjustments associated with electrical energy costs (e.g., associated with the central electrical energy). For example, as discussed above, the cost associated with consumption of central electric power to a consumer may be adjusted (e.g., reduced) based on consumption of central electrical energy (e.g., during a limited central electric power availability condition) and/or based on local electrical energy consumption. The second menu 232 may indicate such an adjustment to the cost. The second menu 232 may further provide additional information related to the adjustment to the cost. For example, the second menu 232 may provide information related to the consumption of central electrical energy, the consumption of local electrical energy, and/or other suitable information that may enable a user to determine why the adjustment to the cost associated with consumption of central electric power was effectuated. In this manner, the second UI 220 may encourage the user to control operation of the control system 128 (e.g., via the first UI 180) in a desirable manner that further reduces the cost associated with consumption of central electric power.

Figure 6:
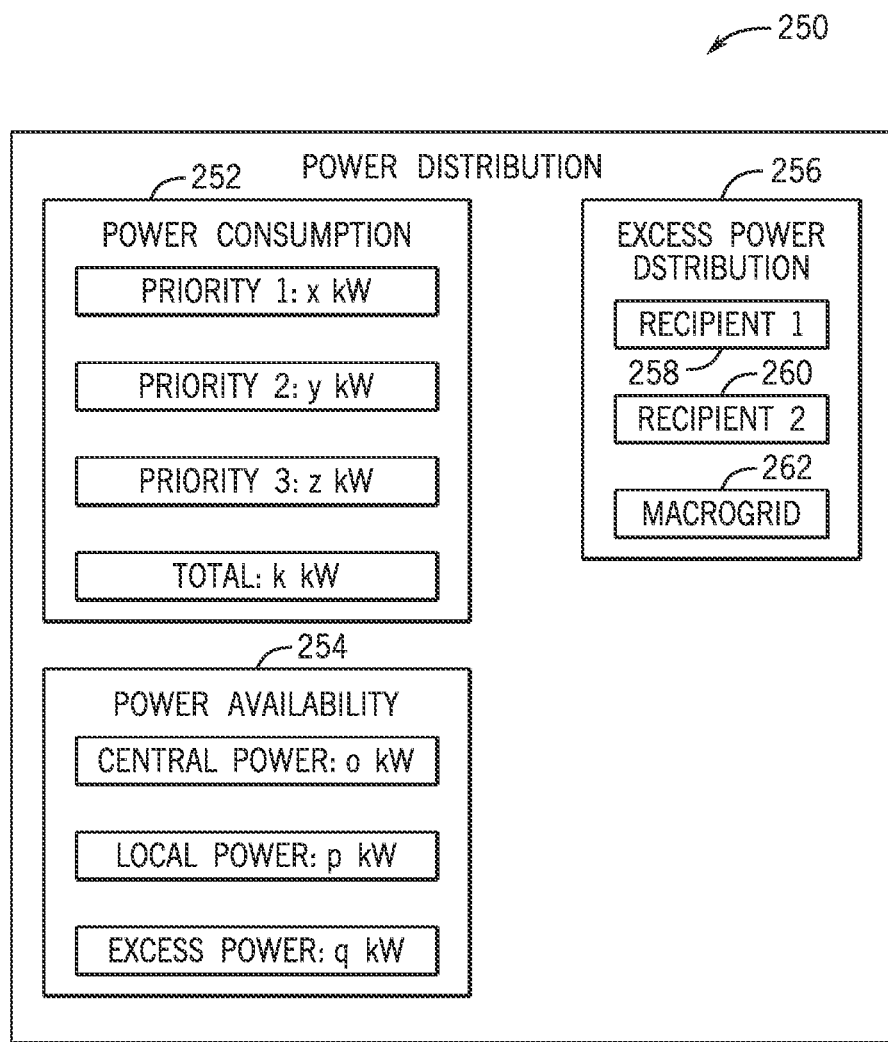
FIG. 6 is an embodiment of a user interface that may be utilized to provide information associated with electrical energy usage, in accordance with an embodiment of the present disclosure.

FIG. 6 is an embodiment of a third UI 250, which may be used to provide information related to distribution of electric power. A first menu 252 may present information related to consumption of electric power for devices of different priorities. For example, the first menu 252 may present consumption of electric power of the respective sets of devices associated with the first priority, the second priority, and the third priority (e.g., as defined by the first UI 180). The first menu 252 may also present total consumption of electric power, which may indicate a summation of electric power consumed by all devices (e.g., all sets of devices associated with the various priorities).

A second menu 254 of the third UI 250 may present available electric power. As an example, the second menu 254 may present an amount of available central electric power and/or available local electric power (e.g., power generated by the local electric power source). Indeed, in some circumstances, the electric power being consumed may be less than an amount of available electric power. By way of example, during a limited central electric power availability condition, a certain amount of central electric power may be allotted for consumption by the consumer. However, the total electric power consumption of the consumer, as indicated by the first menu 252, may be less than the allotted amount of central electric power. As such, there may be excess central electric power available for consumption by the consumer. Thus, the second menu 254 may present the excess central electric power. Additionally or alternatively, the local power source of the consumer may generate more local electric power than that consumed by the consumer. Thus, the second menu 254 may present the excess local electric power. The second menu 254 may further present a total amount of excess electric power, such as a summation of the excess central electric power and the excess local electric power.

The third UI 250 may also include a third menu 256 that may be utilized by the user to indicate where excess electric power, if any, may be distributed. For example, the third menu 256 may include a first icon 258 associated with a first recipient (e.g., a first consumer), a second icon 260 associated with a second recipient (e.g., a second consumer), and a third icon 262 associated with the macrogrid (e.g., the central electric power source 52, the transmission and/or distribution system 54). Selection of one of the icons 258, 260, 262 may cause excess power to be distributed to the associated entity.

As an example, in response to a user input of a selection of the first icon 258, the control system 128 may determine that excess electric power is to be diverted to the first recipient. The control system 128 may determine that the excess electric power includes excess central electric power that may be allotted to but not consumed by the consumer by the transmission and/or distribution system 54. The control system 128 may communicate the user input with the monitoring system 74 and/or directly with the transmission and/or distribution system 54 to cause the transmission and/or distribution system 54 to direct the excess central electric power to the first recipient instead of to the consumer. As another example, in response to selection of the third icon 262, the control system 128 may determine that excess electric power is to be directed to the macrogrid. The control system 128 may determine that excess local electric power (e.g., electric power generated by local renewable resources, such as a solar panel) is being generated by the consumer. The control system 128 may cause the excess local electric power to the macrogrid. For instance, the transmission and/or distribution system 54 may be able to distribute the excess local electric power transmitted by the consumer to a different recipient, such as to one of the other recipients (e.g., a residential consumer, an organization consumer) indicated by and selected via the third menu 256. In certain embodiments, a cost associated with the consumption of central electric power by the consumer may be adjusted (e.g., reduced) based on the consumer transmitting excess local electric power to the macrogrid and thereby increasing available electric power that may be distributed to other consumers.

Although the illustrated third menu 256 enables the user to designate specific recipients to which excess electric power may be distributed, in additional or alternative embodiments, the third menu 256 may enable the user to designate groups of recipients to which excess electric power may be distributed. By way of example, the third menu 256 may include types of recipients, such as an organization type (e.g., hospitals, care facilities, schools), devices used by recipients (e.g., recipients that utilize medical devices), recipients at a particular geographical area (e.g., a neighborhood, a town, a city, a county), a category of recipients (e.g., residential households associated with a particular typical electric power consumption, a particular quantity of occupants, a particular income, a particular age of occupants), and the like. Thus, based on the selection of a particular group of recipient, central electric power and/or local electric power may be distributed to recipients associated with the particular group instead of to, for example, a specific individual recipient.

Each of FIGS. 7-13 described below illustrates a respective method or process of an operation associated with electrical energy distribution. Any suitable device (e.g., the processing circuitry 154 of the control system 128, the processing circuitry 154 of the monitoring system 74) may perform the respective methods. Indeed, each method may be implemented by executing instructions stored in a tangible, non-transitory, computer-readable medium (e.g., the memory 152 of the control system 128, the memory 152 of the monitoring system 74). In some embodiments, the steps of each respective method may be performed by a single component or system. In additional or alternative embodiments, multiple components or systems may perform the steps for a single one of the methods. For example, each method may be performed at least in part by one or more software components, one or more hardware components, one or more software applications, and the like. While each method is described using steps in a specific sequence, additional steps may be performed, the described steps may be performed in different sequences than the sequence illustrated, and/or certain described steps may be skipped or not performed altogether. Further still, the steps of any of the respective methods may be performed in parallel with one another, such at the same time and/or in response to one another.

Figure 7:
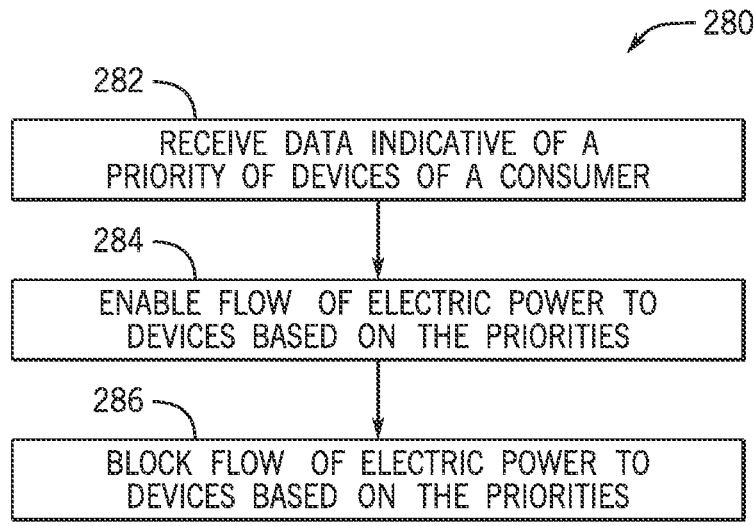
FIG. 7 is a flowchart of an embodiment of a method for controlling electric power distributed to devices, in accordance with an embodiment of the present disclosure.

FIG. 7 is a flowchart of an embodiment of a method 280 for controlling distribution of electric power to devices of a consumer. At block 282, data indicative of priority of devices of the consumer may be received. For example, the data may be received via user input, such as a user input assigning the devices to respective priorities via the first UI 180 and/or a user input adjusting the priority of a device via the second UI 220. Thus, based on the data, a priority for each device may be determined.

At block 284, flow of electric power to certain devices may be enabled based on the priorities. In some embodiments, a determination may be made that devices associated with a particular priority are to receive electric power. For instance, a threshold priority may be determined based on a determined amount of central electric power and/or local electric power available for distribution. Electric power may be enabled to flow to devices that are associated with the threshold priority and/or a priority above the threshold priority. As an example, there may be a limited amount of available central electric power (e.g., during a limited central electric power availability condition) and/or available local electric power. In response, the available electric power may be distributed to devices of a higher priority. For instance, electric power may be distributed to devices in accordance with a descending order of associated priority (e.g., electric power may be distributed to all devices of the highest priority before also being distributed to devices of the next highest priority, and so forth) until substantially no electric power remains available for further distribution.

As another example, available local electric power in particular may initially be distributed to devices of a high priority. For instance, first devices having the highest priority may be determined, and local electric power may be enabled to flow to the first devices. Second devices that do not receive local electric power and that are of a lower priority than the first devices may be determined. Available central electric power may then be enabled to flow to the second devices (e.g., to a remainder of devices if there is sufficient central electric power, to a subset of the remainder of devices based on the subset having the next highest priority relative to the first devices if there is insufficient central electric power). In order to enable flow of a certain type of electric power to the devices, the switches 130 associated with the devices and to the type of electric power may be determined. Such switches 130 may be operated (e.g., closed) to enable the type of electric power to flow to the devices. For example, in response to determining that a device is to receive central electric power from the central electric power source 52, the switch 130 associated with the device and controlling flow of central electric power to the outlet to which the device is electrically coupled may be operated to enable the device to receive central electric power.

At block 286, flow of electric power to certain devices may be blocked based on the priorities. As an example, in response to determining that certain devices that are to receive electric power, a remainder of devices may be blocked from receiving electric power (e.g., based on the determined amount of available electric power). For instance, a determination may be made that devices of a threshold priority are to receive electric power, and electric power may be blocked from flowing to devices that are associated with a priority below the threshold priority. Indeed, electric power may be blocked from flowing to some devices in order to avoid inadvertently directing electric power to devices of a lower priority instead of to a higher priority. Similarly, in response to determining that a device is to receive one of central electric power or local electric power, the other of central electric power or local electric power may be blocked from flow to the device to avoid providing redundant or excessive electric power to the device. By way of example, a determination may be made that first devices at a higher priority are to receive local electric power. As such, flow of central electric power to the first devices may be blocked, and/or flow of local electric power to the second devices at a lower priority may be blocked. In any case, in response to determining that a certain type of electric power to a device is to be blocked, the switch 130 associated with the device and with the type of electric power may be operated to block the device from receiving the type of electric power.

In some embodiments, the method 280 may be continually performed (e.g., at a particular frequency, at particular time stamps, in response to receipt of a user input) to enable and/or block flow of electric power to devices. For example, data indicative of the priority of devices may be continually received, and distribution of electric power may be continually adjusted based on the data. In this manner, the distribution of electric power may correspond more suitably to updated priorities of devices. As an example, during a situation in which available electric power may be limited (e.g., a limited central electric power availability condition), the user may adjust the priority of devices based on updated preferences, conditions, desires, concerns, and so forth. For instance, the user may initially assign HVAC equipment to a higher priority because of inclement weather (e.g., excessively high temperature) such that the HVAC equipment may receive available electric power and operate to mitigate effects of the inclement weather. However, at a later time, the inclement weather may subside, and the user may determine that the HVAC equipment is no longer of higher priority. As such, the user may reduce the priority of the HVAC equipment to block the HVAC equipment from receiving the available electric power and, instead, to enable another device to receive the available electric power and operate accordingly. Thus, the distribution of electric power to different devices may be readily and dynamically adjusted in response to updated priority of devices indicated by the user.

Figure 8:
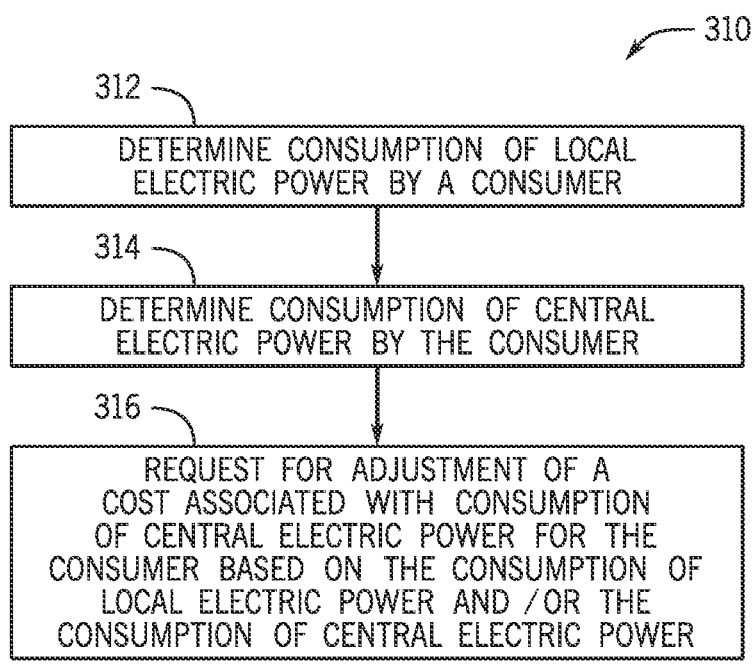
FIG. 8 is a flowchart of an embodiment of a method for adjusting a cost associated with usage of electric power from a central electric power source, in accordance with an embodiment of the present disclosure.

FIG. 8 is a flowchart of an embodiment of a method 310 for adjusting a cost associated with consumption of electric power from a central electric power source for a consumer. At block 312, consumption of local electric power by a consumer may be determined. In some embodiments, an amount of local electrical energy consumed over a duration of time may be determined. For instance, an amount of electric power provided by a local electric power source may be determined over the duration of time. In additional or alternative embodiments, the particular devices that consume local electric power may be determined, and the local electric power may be determined based on an amount of electric power typically or projected to be consumed by the particular devices. By way of example, the devices that consume local electric power may be determined based on the data indicative of the priority of devices and how local electric power is distributed based on the priority. For instance, a determination is made that a device consumes local electric power based on data indicative that local electric power is distributed to devices at or above a threshold priority and that the device is of a priority higher or greater than the threshold priority. The devices that consume local electric power may additionally or alternatively be determined based on whether the switches 130 that control flow of local electric power to the devices are operated to enable flow of local electric power to the devices.

At block 314, consumption of central electric power by the consumer may be determined. That is, the amount of central electrical energy consumed over a duration of time may be determined, such as based on an amount of electric power provided by the central electric power source 52 to the consumer over the duration of time. Additionally or alternatively, the particular devices that consume central electric power may be determined, such as based on data indicative of the priority of devices and how central electric power is distributed based on the priority, and the central electric power may be determined based on an amount of electric power typically or projected to be consumed by the particular devices. Operation of the switches 130 may also be used to determine the devices that consume central electric power, such as based on whether the switches 130 that control flow of central electric power to the devices are operated to enable flow of central electric power to the devices.

At block 316, based on the consumption of local electric power and/or the consumption of central electric power by the consumer, an adjustment of the cost associated with the consumption of central electric power for the consumer may be requested or implemented (e.g., via communication with the transmission and/or distribution system 54). For instance, the cost to the consumer may be reduced. By way of example, as mentioned above, local electric power may be more reliably delivered (e.g., less susceptible to power interruptions) than central electric power. As such, devices receiving local electric power instead of central electric power may operate more reliably (e.g., incur fewer or less frequent suspension of operations). Thus, to encourage the consumer to utilize local electric power instead of central electric power to improve reliable performance of devices, the cost associated with consumption of central electric power may be reduced in response to determining that the consumer sufficiently utilizes local electric power. As an example, in response to a determination that a difference between a first amount of local electric power and a second of central electric power (e.g., a percentage difference, a raw number difference) is above a threshold difference to indicate that the consumer may utilize a relatively high amount of local electric power compared to central electric power, a request may be transmitted to reduce the cost associated with consumption of central electric power for the consumer. Indeed, the amount in which the cost is reduced may be proportional to the difference between the local electric power consumption and the central electric power consumption. That is, a greater amount in which the cost is reduced may be requested in response to a greater difference between the local electric power consumption and the central electric power consumption.

Additionally or alternatively, an amount of local electric power being consumed may be compared to an amount of available local electric power for consumption. In response to a determination that the amount of local electric power being consumed is greater than a threshold percentage of the amount of available local electric power for consumption to indicate that the consumer is utilizing a high amount of available local electric power, the request may be transmitted to reduce the cost associated with consumption of central electric power for the consumer. Thus, the consumer may be encourage to utilize a greater portion of the amount of available local electric power and therefore reduce reliance on the central electric power.

Furthermore, the consumer may be encouraged to direct flow of local electric power to certain types of devices, such as medical devices, security devices, food-related devices, environmental devices, or any other suitable devices that may be associated with greater importance and/or life utility, to improve reliable operation (e.g., to mitigate suspended operation) of such devices. To this end, the type of devices that are configured to receive local electric power and/or the type of devices that are configured to receive central electric power may be determined. In response to determining that the amount of local electric power consumed by devices of a certain type (e.g., a high importance) exceeds a threshold level (e.g., relative to the amount of central electric power consumed by the devices of the same type), the request may be transmitted to reduce the cost associated with consumption of central electric power for the consumer. Additionally or alternatively, in response to determining that a quantity of devices of a certain type consuming local electric power is greater than a threshold level (e.g., relative to the quantity of devices of the same type consuming central electric power), the request may be transmitted to reduce the cost associated with consumption of central electric power for the consumer. In this manner, in addition to encouraging usage of local electric power, the consumer may be encouraged to provide the local electric power for consumption by particular types of devices.

Figure 9:
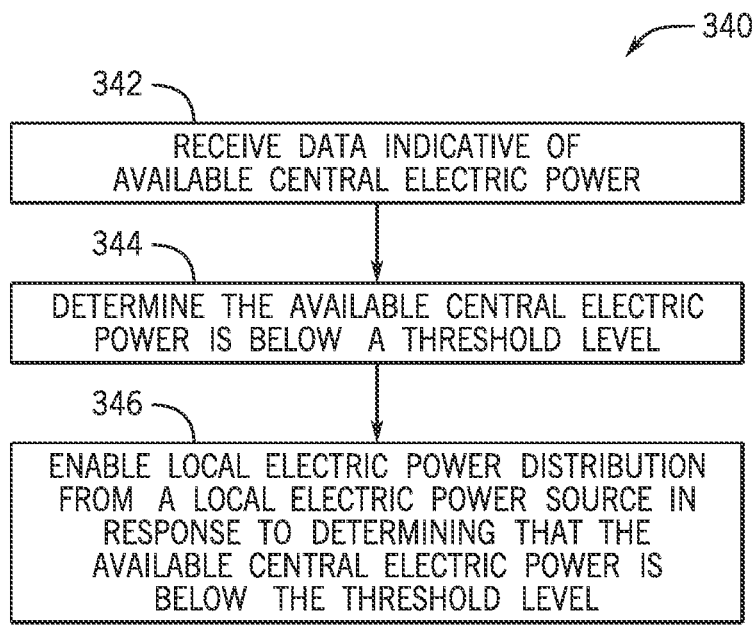
FIG. 9 is a flowchart of an embodiment of a method for controlling electric power distribution from a local electric power source, in accordance with an embodiment of the present disclosure.

FIG. 9 is a flowchart of a method 340 for controlling electric power distribution from the local electric power source of a consumer. At block 342, data indicative of available central electric power (i.e., from the central electric power source 52) may be received. For example, a determination may be made whether there is a limited central electric power availability condition. To this end, a determination may be made regarding whether the available central electric power is above a threshold level associated with a limited central electric power availability condition. In some embodiments, in response to a determination that the available central electric power is above the threshold level to indicate a regular central electric power availability condition, the available central electric power may be utilized to operate devices. For example, the local electric power source 120 may be blocked from providing local electric power to the electrical connection system 102.

At block 344, the available central electric power may be determined to be below the threshold level to indicate a limited central electric power availability condition. In some circumstances, the amount of available central electric power may not be sufficient enough to fulfill the electrical consumer demand of the consumer. Thus, certain devices of the consumer may not receive central electric power, and operation of such devices may be interrupted.

At block 346, in response to determining that the available central electric power is below the threshold level, distribution of local electric power from the local electric power source 120 may be enabled. That is, local electric power may flow from the local electric power source 120 to the electrical connection system 102. Thus, certain devices may receive local electric power to enable operation of such devices. By way of example, devices that may previously be configured to receive central electric power during the regular central electric power availability condition may instead receive local electric power during the limited central electric power availability condition.

In certain embodiments, a certain device may be configured to receive local electric power and not central electric power. That is, while local electric power is blocked from distribution, operation of the device may be suspended even though sufficient central electric power may be provided to the consumer. However, while flow of local electric power is enabled, such as in response to the available central electric power being below the threshold level, operation of the device may be enabled. By way of example, the device may be configured to provide assistance specifically during a limited central electric power availability condition and may include lighting (e.g., backup lighting), an audio emitter (e.g., a speaker), a radio, and so forth. Indeed, a utility or usefulness of the device during a regular central electric power availability condition may be limited. Therefore, the device may not be in operation during the regular central electric power availability condition to reduce electrical energy consumption. In certain embodiments, a user input (e.g., received via the UI 162) may designate that operation of the device is suspended in the absence of local electric power even while central electric power is available and that operation of the device is enabled while distribution of local electric power is enabled.

Figure 10:
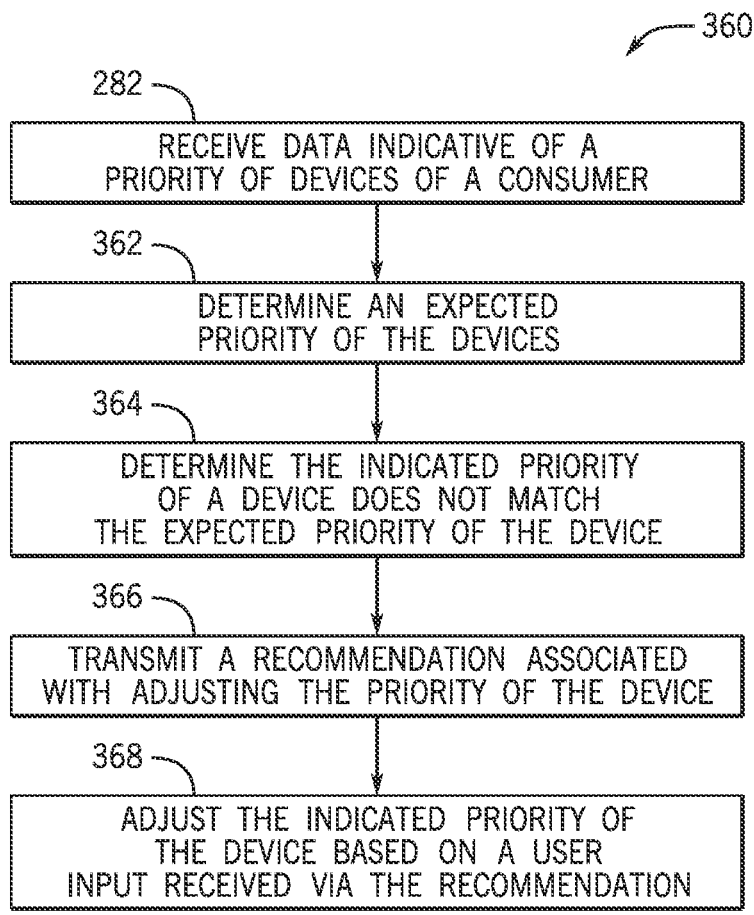
FIG. 10 is a flowchart of an embodiment of a method for transmitting a notification associated with a priority of a device for electric power distribution, in accordance with an embodiment of the present disclosure.

FIG. 10 is a flowchart of an embodiment of a method 360 for transmitting a recommendation associated with adjusting a priority of a device for a consumer. At block 282, data indicative of the priority of devices of the consumer may be received in the manner described above, such as via a user input. Thus, a respective priority associated with the devices of the consumer may be indicated.

At block 362, an expected priority of the devices may be determined. In some embodiments, the expected priority of the devices may be determined based on preset or predetermined data. For example, the preset data (e.g., a database table) may associate devices having a particular parameter or characteristic, such as of a certain type and/or consuming a particular amount of electric power, to a corresponding expected priority. Thus, based on an identified parameter of a device, the corresponding expected priority, as indicated by the preset data, may be determined. In additional or alternative embodiments, the expected priority may be determined based on a priorities provided by other consumers to similar devices. That is, data indicative of the priority of devices of other consumers may be received. For a device of the consumer having a particular parameter or characteristic (e.g., a certain type, consuming a particular amount of electric power), an expected priority may be determined based on indicated priorities of devices of other consumers having a similar parameter or characteristic. As an example, a determination may be made that a quantity and/or a percentage of the devices having the similar parameter may be associated with a common priority. Based on the quantity and/or percentage being above a threshold value, the expected priority may be determined as the common priority.

The indicated priority received at block 282 may be compared to the expected priority of the device determined at block 362. In response to a determination that the indicated priority matches the expected priority, no further action may occur. For example, no recommendation or notification may be transmitted in response to the match between the indicated priority and the expected priority. However, at block 364, a determination may be made that the indicated priority of the device does not match the expected priority of the device. At block 366, in response to determining that the indicated priority does not match the expected priority, a recommendation or notification may be transmitted. The recommendation may be associated with adjusting the priority of the device toward the expected priority, such as to increase or decrease the priority. The recommendation may also provide information regarding why the adjustment of the priority may be recommended, such as how the expected priority may be determined (e.g., a parameter associating the device with the expected priority, an indication of priorities of similar devices as assigned by other consumers). In certain embodiments, the recommendation may be transmitted in response to a difference between the indicated priority and the expected priority exceeding a threshold difference, such as that the priorities are not within one priority ranking of one another (e.g., the indicated priority is a high priority, the expected priority is a low priority, and at least one intermediate priority is between the high priority and the low priority).

At block 368, the indicated priority of the device may be adjusted based on a user input received via the recommendation transmitted at block 364. For example, the recommendation (e.g., the first recommendation menu 224, the second recommendation menu 226) may be transmitted and presented via the second UI 220, and the user input may be received via the second UI 220 using the presented recommendation. In response to the user input confirming or agreeing to adjust the indicated priority of the device in accordance with the recommendation, the indicated priority may be adjusted (e.g., increased, reduced) toward the expected priority. However, in response to the user input declining or blocking adjustment of the indicated priority, the currently indicated priority of the device may be maintained. In certain embodiments, after the recommendation has been presented for the device, the same recommendation (e.g., based on an expected priority that has already been previously determined) may be blocked from being transmitted for a duration of time. In an example, the recommendation may be blocked until different expected priority of the device and/or a different indicated priority of the device has been determined. In another example, the recommendation may be blocked until a threshold duration of time since previous transmission of the recommendation has elapsed. In this manner, a number of recommendations transmitted to the user may be limited in order to provide the user with recommendations that may be more useful or relevant for adjusting priority of devices.

Figure 11:
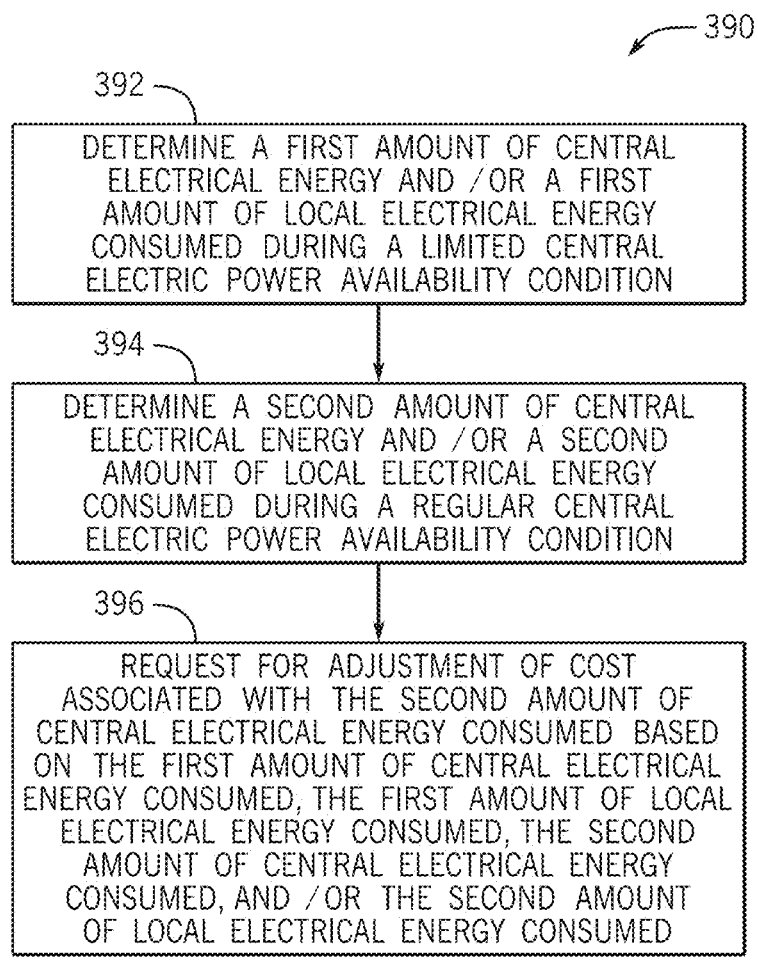
FIG. 11 is a flowchart of an embodiment of a method for adjusting a cost associated with consumption of electrical energy from a central electric power source based on consumption of electrical energy during different electric power availability conditions, in accordance with an embodiment of the present disclosure.

FIG. 11 is a flowchart of a method 390 for adjusting cost associated with consumption of central electrical energy for a consumer based on consumption of central electrical energy during different central electric power availability conditions. At block 392, a first amount of central electrical energy and/or a first amount of local electrical energy consumed by the consumer during a limited central electric power availability condition may be determined. For example, the first amount of central electrical energy and/or the first amount of local electrical energy consumed may be monitored during a brownout condition and/or a blackout condition. In some embodiments, the first amount of central electrical energy may be directly determined based on the central electric power delivered to the consumer during the limited central electric power availability condition, and the first amount of local electrical energy may be directly determined based on the local electric power delivered during the limited central electric power availability condition. In additional or alternative embodiments, the first amount of central electrical energy may be determined based on the devices that are configured to consume central electric power (e.g., based on priority of devices, based on the switches 130 that are in operation to enable flow of central electric power) during the limited central electric power availability condition and the amount of electric power that may be consumed by such devices. Similarly, the first amount of local electrical energy may be determined based on the devices that are configured to consume local electric power during the limited central electric power availability condition and the amount of electric power that may be consumed by such devices.

At block 394, a second amount of central electrical energy and/or a second amount of local electrical energy consumed by the consumer during a regular central electric power availability condition may be determined. The second amount of central electrical energy may be determined based on the central electric power delivered to the consumer during the regular central electric power availability condition and/or by determining the devices that are configured to consume the central electric power during the regular central electric power availability condition. The second amount of local electrical energy may be determined based on the local electric power delivered during the regular central electric power availability condition and/or by determining the devices that are configured to consume the local electric power during the regular central electric power availability condition.

At block 396, based on the first amount of central electrical energy consumed during the limited central electric power availability condition, the first amount of local electrical energy consumed during the limited central electric power availability condition, the second amount of central electrical energy consumed during the regular central electric power availability condition, and/or the second amount of local electrical energy consumed during the regular central electric power availability condition, an adjustment of the cost associated with the second amount of central electrical energy consumed may be requested. By way of example, during a limited central electric power availability condition, a limited amount of available central electric power may be allotted to each consumer. A first consumer may consume less central electric power than a first limited amount of available central electric power allotted to the first consumer. For instance, the first consumer may increase consumption of local electric power during the limited central electric power availability condition in order to reduce consumption of central electric power.

As a result, more central electric power may be available for distribution to a different consumer. For example, additional central electric power that was initially allotted to the first consumer, but was not consumed by the first consumer, may instead be distributed to a second consumer, thereby increasing a second limited amount of available central electric power allotted to the second consumer. In this manner, the central electric power may be more suitably and readily distributed to different consumers, such as to increase or improve fulfillment of different electrical consumer demands. For this reason, consumers may be encouraged to reduce consumption of central electric power and/or to increase consumption of local electric power during a limited central electric power availability condition in order to increase availability of central electric power for other consumers (e.g., consumers who may not be able to substantially reduce consumption of central electric power during a limited central electric power availability condition). To this end, the cost associated with consumption of central electrical energy (e.g., the second amount of central electrical energy consumed) during the regular central electric power availability condition may be reduced in response to a determined decrease in consumption of central electrical energy (e.g., the first amount of central electrical energy consumed) during the limited central electric power availability condition.

In some embodiments, the request to reduce the cost associated with the second amount of central electrical energy consumed during the regular central electric power availability condition may be transmitted in response to a determination that the first amount of central electrical energy consumed is below a threshold level. For example, the threshold level may correspond to the available central electric power allotted to the consumer. Thus, the cost associated with the second amount of central electrical energy consumed during the regular central electric power availability condition may be reduced in response to a determination that the consumer consumed substantially less central electrical energy than that allotted to the consumer during the limited central electric power availability condition. In additional or alternative embodiments, the first amount of central electrical energy consumed may be compared to the second amount of central electrical energy consumed. In such embodiments, the request to reduce the cost associated with the second amount of central electrical energy consumed during the regular central electric power availability condition may be transmitted in response to a difference between the first amount of central electrical energy consumed and the second amount of central electrical energy consumed exceeding a threshold value. For instance, a significant difference between the first amount of central electrical energy consumed and the second amount of central electrical energy consumed (e.g., a difference exceeding the threshold value) may indicate that the consumer substantially reduced consumption of central electrical energy during the limited central electric power availability condition relative to the central electrical energy that may normally be consumed during the regular central electric power availability condition. That is, the cost associated with the second amount of central electrical energy consumed during the regular central electric power availability condition may be reduced in response to a determination that the consumer reduced typical consumption of central electric power for the limited central electric power availability condition.

In further embodiments, the request to reduce the cost associated with the second amount of central electrical energy consumed during the regular central electric power availability condition may be transmitted in response to a determination that the consumption of local electrical energy has increased (e.g., to help offset the reduced consumption of central electrical energy) during the limited central electric power availability condition. Thus, the request may be transmitted in response to a determination that the first amount of local electrical energy consumed during the limited central electric power availability condition is above a threshold level. Additionally or alternatively, the first amount of local electrical energy consumed may be compared to the second amount of local electrical energy consumed. The request to reduce the cost associated with the second amount of central electrical energy consumed during the regular central electric power availability condition may be transmitted in response to a difference between the first amount of local electrical energy consumed and the second amount of local electrical energy consumed exceeding a threshold value (e.g., to indicate that the consumer increased typical consumption of local electrical energy for the limited central electric power availability condition).

In some circumstances, the consumer may have already paid for the second amount of central electrical energy consumed prior to determination of whether the cost associated with the second amount of central energy consumed is to be adjusted. That is, the consumer may not have paid an appropriately reduced cost for the second amount of central electrical energy consumed. For example, the regular central electric power availability associated with the second amount of central electrical energy and/or the second amount of local electrical energy may have occurred before the limited central electric power availability associated with the first amount of central electrical energy and/or the first amount of local electrical energy. For this reason, in order to implement a reduction of the cost associated with the second amount of central electrical energy consumed, the consumer may receive a credit or a discount for a subsequent amount of central electrical energy consumed during a regular central electric power availability condition.

Figure 12:
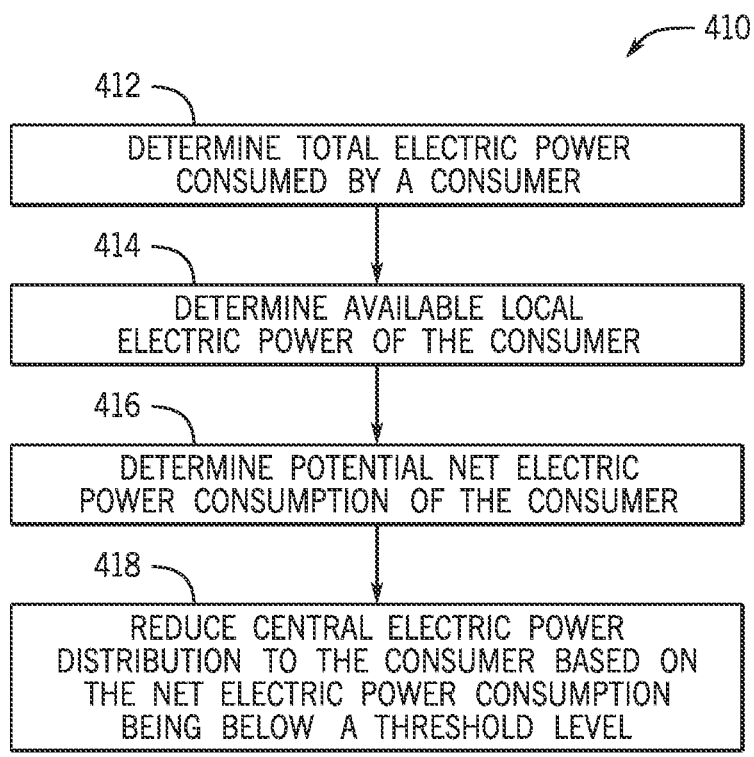
FIG. 12 is a flowchart of an embodiment of a method for adjusting electric power distribution for a consumer, in accordance with an embodiment of the present disclosure.

FIG. 12 is a flowchart of an embodiment of a method 410 for adjusting electric power distribution for a consumer. At block 412, total or gross electric power consumed by the consumer is determined. For example, the total electric power consumed by the consumer may be based on an amount of central electric power provided by the central electric power source 52 to the consumer (e.g., to the electrical connection system 102 of the structure(s) 100 associated with the consumer) and/or an amount of local electric power provided by the local electric power source 120. The total electric power consumed by the consumer may additionally or alternatively be determined based on the devices that are configured to consume electric power, historical consumption of electric power, and so forth.

At block 414, available local electric power of the consumer may be determined. The available local electric power may include generated local electric power. As an example, the local electric power may be generated via different components (e.g., the solar panel 122) of the local electric power source 120, and an amount of the local electric power generated may be determined based on the operation of such components. As another example, the available local electric power may include stored local electric power (e.g., at the power storage 124). The combination or summation of generated local electric power and stored local electric power may indicate the total amount of local electric power available for consumption by the consumer.

At block 416, potential net electric power consumption of the consumer may be determined. The potential net electric power consumption may be based on the total electric power consumed by the consumer and the available local electric power, such as the total electric power consumed minus the available local electric power. In this manner, the potential net electric power consumption may be indicative of an amount of central electric power that is to be delivered to the consumer to fulfill the electrical consumer demand associated (e.g., an entirety of the total electric power to be consumed) with the consumer if all of the available electric power were to be consumed as a part of the total electric power consumed. For example, if the total electric power consumed is 100 kilowatt hours and the available local electric power is 40 kilowatt hours, then the potential net electric power consumption is 60 kilowatt hours, and 60 kilowatt hours of central electric power may be delivered to the customer to fulfill the 60 kilowatt hours of potential net electric power consumption. Therefore, for a consumer having a greater amount of electric power consumed than available local electric power, central electric power may be delivered to fulfill at least a portion of the electrical consumer demand. However, in some circumstances, the consumer may have more available local electric power (e.g., generate more local electric power, store more local electric power) than total electric power consumed. In this case, the consumer may utilize local electric power to fulfill an entirety of the electrical consumer demand without having to consume central electric power. For instance, if the total electric power consumed is 100 kilowatt hours and the available local electric power is 140 kilowatt hours, then the potential net electric power consumption is –40 kilowatt hours, indicating that there is a surplus of 40 kilowatt hours of local electric power after the available local electric power has been consumed as a part of the total electric power consumed.

At block 418, central electric power distribution to the consumer may be reduced (e.g., central electric power distributed to the electrical connection system 102 of a structure(s) 100 associated with the consumer) based on the net electric power consumption being below a threshold level. For example, a sufficiently low net electric power consumption may indicate that the consumer does not consume a high amount of electric power and/or that the consumer has a high amount of available local electric power available. For instance, the available local electric power may fulfill a significant portion (e.g., substantially all) of the electrical consumer demand. As such, the consumer may not consume a significant amount of central electric power. For this reason, the amount of central electric power delivered to the consumer may be reduced to enable the consumer to consume the available local electric power instead of central electric power. By way of example, during a limited central electric power availability condition in which each consumer may be allotted with a limited amount of available central electric power, a determination may be made that the consumer may not utilize at least a portion of their limited amount of available central electric power (e.g., the consumer may utilize the available local electric power instead). Therefore, the amount of available central electric power allotted to the consumer may be reduced and instead, for example, be distributed or consumed elsewhere. Thus, other electrical consumer demands may be at least partially fulfilled by consuming the available central electric power that would otherwise be allotted to and potentially be unconsumed by the consumer. In such circumstances, the threshold level to which the net electric power consumption is compared may correspond to the amount of available central electric power allotted to the consumer.

Figure 13:
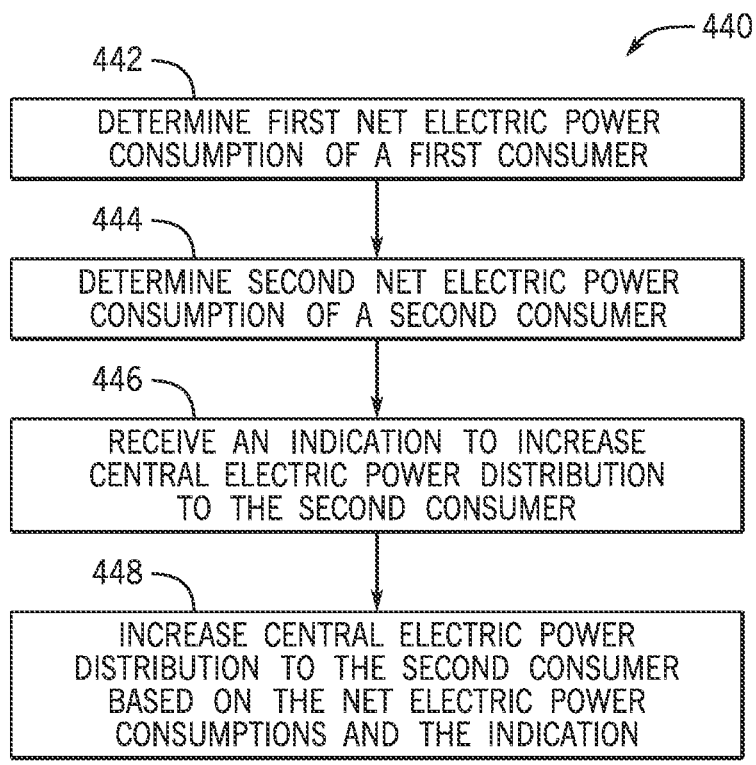
FIG. 13 is a flowchart of an embodiment of method for adjusting electric power distribution for a consumer, in accordance with an embodiment of the present disclosure.

FIG. 13 is a flowchart of an embodiment of a method 440 for adjusting electric power distribution for a consumer. At block 442, first net electric power consumption of a first consumer is determined. For example, the first net electric power consumption may be determined using techniques described with respect to FIG. 12, such as based on total electric power consumed by the first consumer and available local electric power of the first consumer. At block 444, second net electric power consumption by a second consumer may be determined. Similar to the first net electric power consumption, the second net electric power consumption may be determined based on the total electric power consumed by the second consumer and available local electric power of the second consumer (e.g., local electric power from a local electric power source of the second consumer and separate from the local electric power source of the first consumer).

At block 446, an indication to increase central electric power distribution to the second consumer may be received. The indication may be received via a user input, such as via the third UI 250, and may indicate a request to distribute available and/or unconsumed central electric power to the second consumer. Additionally or alternatively, the indication may include a determined increase of the electrical consumer demand associated with the second consumer, such as that operation of the devices associated with the second consumer may have increased.

At block 448, central electric power distributed to the second consumer (e.g., central electric power distributed to the electrical connection system 102 associated with the structure(s) 100 of the second consumer) may be increased based on the first net electric power consumption of the first consumer, the second net electric power consumption of the second consumer, and/or the received indication to increase central electric power distribution to the second consumer. For instance, the distribution of central electric power to the first consumer (e.g., to the electrical connection system 102 associated with the structure(s) 100 of the first consumer) may be reduced based on the first net electric power consumption (e.g., being below a threshold level). Thus, additional central electric power may be available for distribution. Based on the received indication (e.g., a user input transmitted by the first consumer), such available central electric power may be distributed to the second consumer. In some embodiments, an amount of central electric power to be distributed to the second consumer may be determined. As an example, the electrical consumer demand of the second consumer may be determined to exceed the amount of available central electric power allotted to the second consumer (e.g., based on an amount in which the second net electric power consumption of the second consumer is above a threshold level). The amount of central electric power (e.g., additional central electric power) to be distributed may be determined by the difference between the electrical consumer demand and the allotted available central electric power, and the determined amount of central electric power may be delivered to the second consumer from the available central electric power originally allotted to the first consumer.

In some instances, the amount of electric power generated by the first consumer may be greater than the amount of electric power consumed by the first consumer. As a result, the first consumer may have a surplus of available electric power that may be usable by another consumer. In certain embodiments, the first consumer may be configured to deliver the surplus of electric power to the macrogrid, such as to the transmission and/or distribution system 54. The electric power delivered by the first consumer may then be directed to another consumer, such as to the second consumer via the transmission and/or distribution system 54. In this manner, the second consumer may be able to utilize at least a portion of the electric power generated by the first consumer.

In certain embodiments, the net electric power consumption of other consumers may also be determined, and the central electric power may be distributed based on additional net electric power consumptions. For example, available central electric power from multiple consumers may be collected to form a combined available central electric power. Portions of the combined available central electric power may be distributed to different consumers (e.g., different consumers associated with net electric power consumptions that are above a respective threshold level), such as based on an amount of the combined available central electric power. Thus, instead of directly transmitting individual available central electric power to respective consumers, a collection of available central electric power may be apportioned to different consumers. As such, the respective electric power consumptions of different consumers may be monitored to coordinate how central electric power may be distributed.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
an electrical connection system configured to transmit electric power to a plurality of devices associated with a structure, wherein the electrical connection system is configured to receive electric power from an external power source; and
a control system associated with the structure, wherein the control system is configured to perform operations comprising:
receiving priority data indicative of a respective priority associated with the plurality of devices;
receiving usage data indicative of electrical energy usage for each of the plurality of devices;
operating the electrical connection system to:
direct flow of the electric power from the external power source to a first subset of the plurality of devices based at least in part on the priority data and the usage data; and
block flow of the electric power from the external power source to a second subset of the plurality of devices based at least in part on the priority data and the usage data.

2. The system of claim 1, wherein the control system is configured to receive the priority data via a user input.

3. The system of claim 1, wherein the priority data is indicative of a first priority associated with the first subset of the plurality of devices and a second priority associated with the second subset of the plurality of devices, the first priority is higher than the second priority.

4. The system of claim 1, wherein the electrical connection system comprises a switch configured to enable and block flow of the electric power from the external power source to the plurality of devices.

5. The system of claim 1, wherein the electrical connection system is configured to receive local electric power provided by a local electric power source, and the control system is configured to operate the electrical connection system to selectively direct or block the local electric power to the first or second subsets of the plurality of devices based at least in part on the priority data and the usage data.

6. The system of claim 5, wherein the local electric power source comprises a solar panel, a battery storage, a portable generator, a wind turbine, or any combination thereof.

7. A non-transitory computer-readable medium, comprising instructions that, when executed by processing circuitry, cause the processing circuitry to perform operations comprising:
receiving priority data associating a plurality of devices with corresponding, respective priorities;
directing flow of electric power to a first subset of the plurality of devices based at least in part on the corresponding, respective priorities associated with the first subset of the plurality of devices;
blocking flow of electric power to a second subset of the plurality of devices based at least in part on the corresponding, respective priorities associated with the second subset of the plurality of devices; and
adjusting flow of electric power to the first and second subsets of the plurality of devices based at least in part on electrical energy usage of the plurality of devices.

8. The non-transitory computer-readable medium of claim 7, wherein the priority data associates the first subset of the plurality of devices with a first priority, the priority data associates the second subset of the plurality of devices with a second priority lower than the first priority, and the instructions, when executed by the processing circuitry, cause the processing circuitry to direct the flow of electric power to the first subset of the plurality of devices and to block the flow of electric power to the second subset of the plurality of devices based at least in part on the second priority associated with the second subset of the plurality of devices being lower than the first priority associated with the first subset of the plurality of devices.

9. The non-transitory computer-readable medium of claim 8, wherein the flow of electric power comprises flow of local electric power from a local electric power source, the priority data associates a third subset of the plurality of devices with a third priority lower than the second priority, and the instructions, when executed by the processing circuitry, cause the processing circuitry to perform operations comprising directing flow of central electric power from a central electric power source to the second subset of the plurality of devices and blocking the flow of central electric power to the third subset of the plurality of devices based on the third priority associated with the third subset of the plurality of devices being lower than the second priority associated with the second subset of the plurality of devices.

10. The non-transitory computer-readable medium of claim 9, wherein the instructions, when executed by the processing circuitry, cause the processing circuitry to block the flow of central electric power to the first subset of the plurality of devices based at least in part on the second priority associated with the second subset of the plurality of devices being lower than the first priority associated with the first subset of the plurality of devices.

11. The non-transitory computer-readable medium of claim 7, wherein the instructions, when executed by the processing circuitry, cause the processing circuitry to perform operations comprising:
receiving a user input adjusting the priority data to associate the plurality of devices with updated, corresponding, respective priorities; and
adjusting the flow of electric power to the first and second subsets of the plurality of devices based at least in part on the updated, corresponding, respective priorities associated with the first and second subsets of the plurality of devices via the priority data adjusted by the user input.

12. The non-transitory computer-readable medium of claim 7, wherein the flow of electric power comprises flow of local electric power from a local electric power source, and the instructions, when executed by the processing circuitry, cause the processing circuitry to perform operations comprising:
determining flow of central electric power from a central electric power source is below a threshold level; and
enabling the flow of local electric power to the first and second subsets of the plurality of devices in response to determining the flow of central electric power is below the threshold level.

13. The non-transitory computer-readable medium of claim 12, wherein the local electric power source comprises a solar panel, a battery storage, a portable generator, a wind turbine, or any combination thereof.

14. A system, comprising:
an electrical connection system associated with a structure, wherein the electrical connection system is configured to receive electric power; and
a control system associated with the structure, wherein the control system is configured to perform operations comprising:
determining a plurality of devices and respective, corresponding priorities associated with the plurality of devices;
determining electrical energy usage for each of the plurality of devices; and
operating the electrical connection system to direct the electric power to the plurality of devices based at least in part on the respective, corresponding priorities and the electrical energy usage of each of the plurality of devices.

15. The system of claim 14, wherein the control system is configured to perform operations comprising enabling flow of electric power to a first subset of the plurality of devices and blocking the flow of electric power to a second subset of the plurality of devices based at least in part on first respective, corresponding priorities associated with the first subset of the plurality of devices being higher than second respective, corresponding priorities associated with the second subset of the plurality of devices.

16. The system of claim 14, wherein the control system is configured to determine the plurality of devices and the respective, corresponding priorities associated with the plurality of devices based at least in part on a user input.

17. The system of claim 16, comprising a monitoring system communicatively coupled to the control system, wherein the monitoring system is configured to perform operations comprising:
identifying a device of the plurality of devices and a corresponding priority associated with the device based at least in part on the user input;
determining an expected priority of the device;
comparing the corresponding priority with the expected priority; and
causing the control system to transmit a notification in response to determining that the corresponding priority does not match the expected priority.

18. The system of claim 17, wherein the control system is configured to perform operations comprising:
receiving an additional user input via the notification to adjust the corresponding priority of the device; and
adjusting the corresponding priority toward the expected priority in response to receiving the additional user input.

19. The system of claim 14, wherein the electrical connection system is configured to receive central electric power from a central electric power source, and the control system is configured to perform operations comprising:
determining a first device of the plurality of devices is associated with a first corresponding priority and a second device of the plurality of devices is associated with a second corresponding priority, wherein the first corresponding priority is higher than the second corresponding priority;
determining that available central electric power received by the electrical connection system is below a threshold level; and
operating the electrical connection system to direct the available central electric power to the first device and block flow of the available central electric power to the second device in response to determining that the available central electric power is below the threshold level and based at least in part on the first corresponding priority associated with the first device being higher than the second corresponding priority associated with the second device.

* * * * *